(12) United States Patent
Maeda et al.

(10) Patent No.: US 7,020,390 B2
(45) Date of Patent: Mar. 28, 2006

(54) AUTOMATIC PHOTOGRAPH SEAL VENDING METHOD AND APPARATUS THEREFOR

(75) Inventors: Tadasu Maeda, Tokyo (JP); Hiroshi Funakoshi, Kyoto (JP); Koji Maekawa, Kyoto (JP); Tsuneo Okada, Kyoto (JP); Masanori Saito, Kyoto (JP); Sachiro Arimoto, Kyoto (JP); Masahiko Taniguchi, Kyoto (JP); Yukiyasu Takao, Kyoto (JP)

(73) Assignee: Omron Corporation, (JP)

( * ) Notice: Subject to any disclaimer, the term of this patent is extended or adjusted under 35 U.S.C. 154(b) by 0 days.

(21) Appl. No.: 10/323,902

(22) Filed: Dec. 20, 2002

(65) Prior Publication Data

US 2003/0152376 A1    Aug. 14, 2003

(30) Foreign Application Priority Data

Dec. 28, 2001 (JP) ............................. 2001-399877
Mar. 26, 2002 (JP) ............................. 2002-085565
May 17, 2002 (JP) ............................. 2002-142762

(51) Int. Cl.
G03B 15/00 (2006.01)
G03B 21/56 (2006.01)
G03B 21/14 (2006.01)
H04N 5/222 (2006.01)
H04N 5/74 (2006.01)

(52) U.S. Cl. .................. 396/2; 396/4; 348/239; 348/370; 348/744; 359/443; 353/79

(58) Field of Classification Search ............... 396/1–6; 358/302; 353/47, 50, 74; 359/77, 79, 122, 359/443, 460; 348/239, 370, 744
See application file for complete search history.

(56) References Cited

U.S. PATENT DOCUMENTS 5,623,581 A * 4/1997 Attenberg .................. 358/1.6
6,317,560 B1 * 11/2001 Kawabata ................... 396/2
2003/0030746 A1 * 2/2003 Manico et al. .............. 348/370

FOREIGN PATENT DOCUMENTS

EP       000916994 A2 *  5/1999
JP       10-115866      *  5/1998

* cited by examiner

*Primary Examiner*—W. B. Perkey
*Assistant Examiner*—Rochelle Blackman
(74) *Attorney, Agent, or Firm*—Dickstein Shapiro & Oshinsky LLP

(57) ABSTRACT

An automatic photograph seal vending method comprising providing a photographing process for creating a photographed picture image or images, wherein an illumination means illuminates one or more subjects in a photographing space and a photographing means takes a photograph; providing an editing process for creating an edited picture image or images, wherein an editing means edits a picture image or images as an object of editing; using an output means to output a predetermined picture image or images; and using a large-sized display means capable of displaying the one or more subjects substantially in life size to display tie predetermined picture image or images to facilitate the photographing process and/or the editing process.

25 Claims, 27 Drawing Sheets

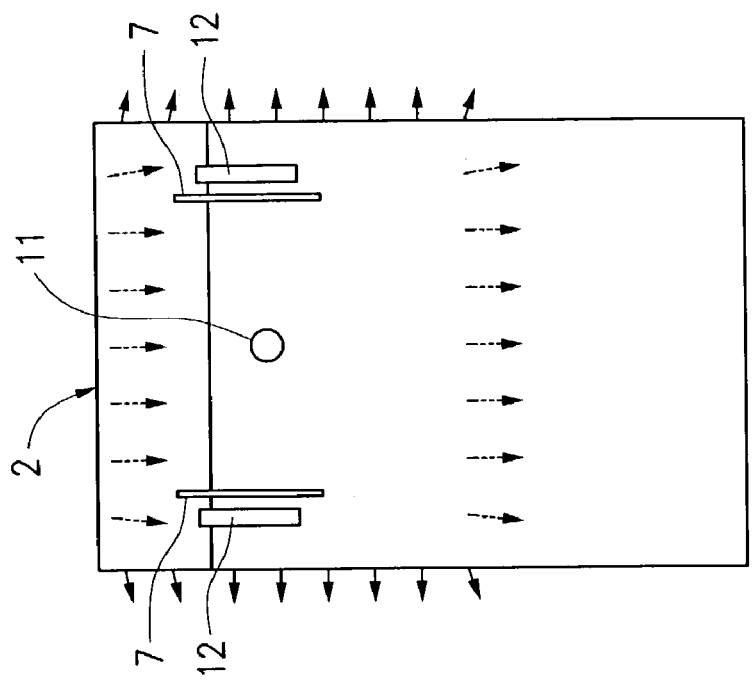
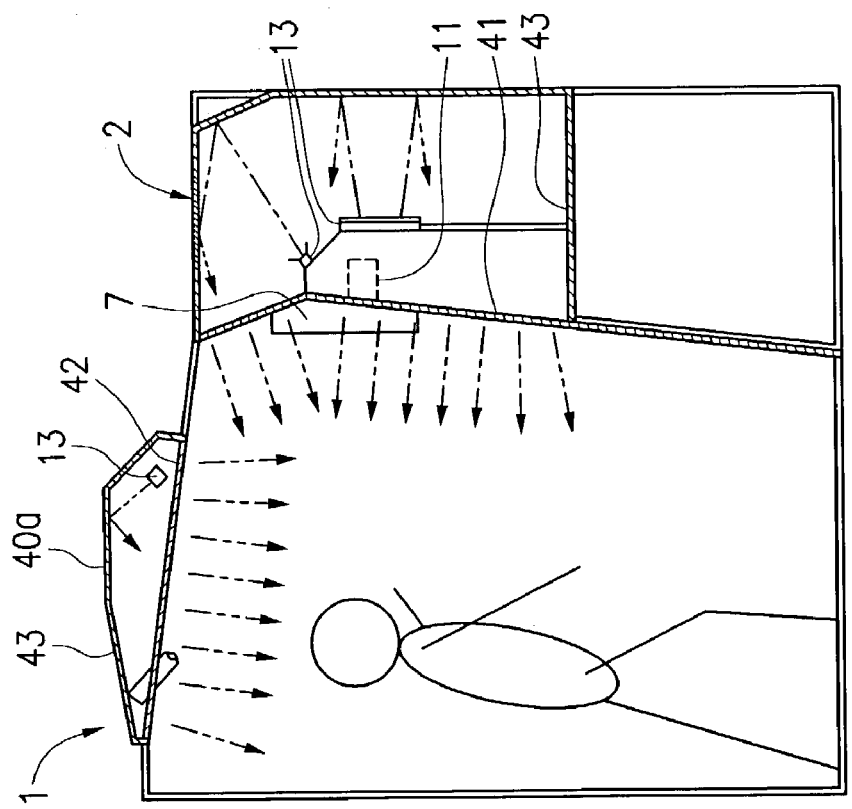
FIG. 8B
FIG. 8A

| No. | PHOTOGRAPHING MODE | CEILING 124e | FRONT SIDE ||||  NOTES |
|---|---|---|---|---|---|---|---|
| | | | UPPER 124a | LEFT 124b | RIGHT 124c | LOWER 124d | |
| 1 | PEARL WHITE | ON | ON | ON | ON | OFF | BRIGHTER THAN PEARL ILLUMINATION |
| 2 | PEARL | ON | ON | ON | ON | OFF | PEARL ILLUMINATION |
| 3 | NATURAL WHITE | OFF | ON | ON | ON | OFF | BRIGHTER THAN NATURAL ILLUMINATION |
| 4 | NATURAL | OFF | ON | ON | ON | OFF | NATURAL ILLUMINATION |
| 5 | GRAVURE (LEFT) | ON | OFF | ON | OFF | OFF | SHADE IS PRESENT RIGHTWARD |
| 6 | GRAVURE (RIGHT) | ON | OFF | OFF | ON | OFF | SHADE IS PRESENT LEFTWARD |
| 7 | BACKLIGHT | ON | OFF | ON | ON | OFF | BACK ILLUMINATION IS CONSPICUOUS |
| 8 | HORROR | OFF | OFF | OFF | OFF | ON | ILLUMINATION FROM UNDER |

FIG. 19

AUTOMATIC PHOTOGRAPH SEAL VENDING METHOD AND APPARATUS THEREFOR

FIELD OF THE INVENTION

The invention relates to photograph seal vending, specifically it relates to a photograph seal vending method and apparatus for ascertaining details of a photographed picture image even from a distance away from a photographing means at the time of posturing and/or photographing.

BACKGROUND OF THE INVENTION

The present invention relates to automatic photograph seal vending, in which, for example, a subject is illuminated and photographed to provide a picture image, which is edited and printed.

Conventional automatic photograph seal vending apparatuses are present, in which a subject is photographed by a digital camera, editing of scribble permits optional letters and figures to be added on a photographed picture image or images obtained in the photographing with the use of a touch panel, and an edited picture image or images are printed by a printer on a photograph seal unit being sold.

Such automatic photograph seal vending apparatuses have comparatively small-sized monitors for ascertaining a posture at the time of photographing.

Also, automatic photograph seal vending apparatuses have short in life cycles and new automatic photograph seal vending apparatuses are provided one after another. Recently, such automatic photograph seal vending apparatuses have been improved to be able to output photograph seal sheets printed in accuracy comparable to silver salt photograph such that detailed countenance of a face and untidiness and details of hair can be represented.

Although an improvement in printing accuracy has been made as described above, details cannot be ascertained at the time of photographing since current monitors for ascertaining a posture are small-sized, and a posture can be ascertained only roughly when photographing is made away from a digital camera in order to photograph a whole body.

Therefore, unexpected results, such as untidiness of hair or the like, may be noticed at the time of editing after the termination of a photographing process or when seeing a photograph seal sheet after printing. These unexpected results lead to user dissatisfaction.

SUMMARY OF THE INVENTION

The invention provides an automatic photograph seal vending method and an apparatus therefor permitting a photographing process for creating a photographed picture image or images, wherein an illumination means illuminates one or more subjects in a photographing space and a photographing means takes a photograph; permitting an editing process for creating an edited picture image or images, wherein an editing means edits a picture image or images as an object of editing; using an output means to output a predetermined picture image or images; and using a large-sized display means capable of displaying the one or more subjects substantially in life size, to display the predetermined picture image or images to permit the photographing process and/or the editing process.

According to the invention, a user can sufficiently ascertain details of a picture image being photographed and/or having been photographed to perform a photographing process even from a distance away from a photographing means at the time of posturing and/or photographing, so that a user is relieved of such a dissatisfaction that unexpected defects in details cause if such defects can only be noticed at the time of editing after photographing or after printing.

Also, when ascertaining a plurality of photographed picture images as acquired, confirmation can be made in high resolution and large size, so that decision is enabled after details of photographed picture image or images as used are ascertained.

BRIEF DESCRIPTION OF THE DRAWINGS

FIG. 8 is a view illustrating an operation of the automatic photograph seal vending apparatus;

FIG. 19 is an illustration showing luminous intensity set values in the automatic photograph seal vending apparatus;

DESCRIPTION OF THE PREFERRED EMBODIMENTS

Figure 1:
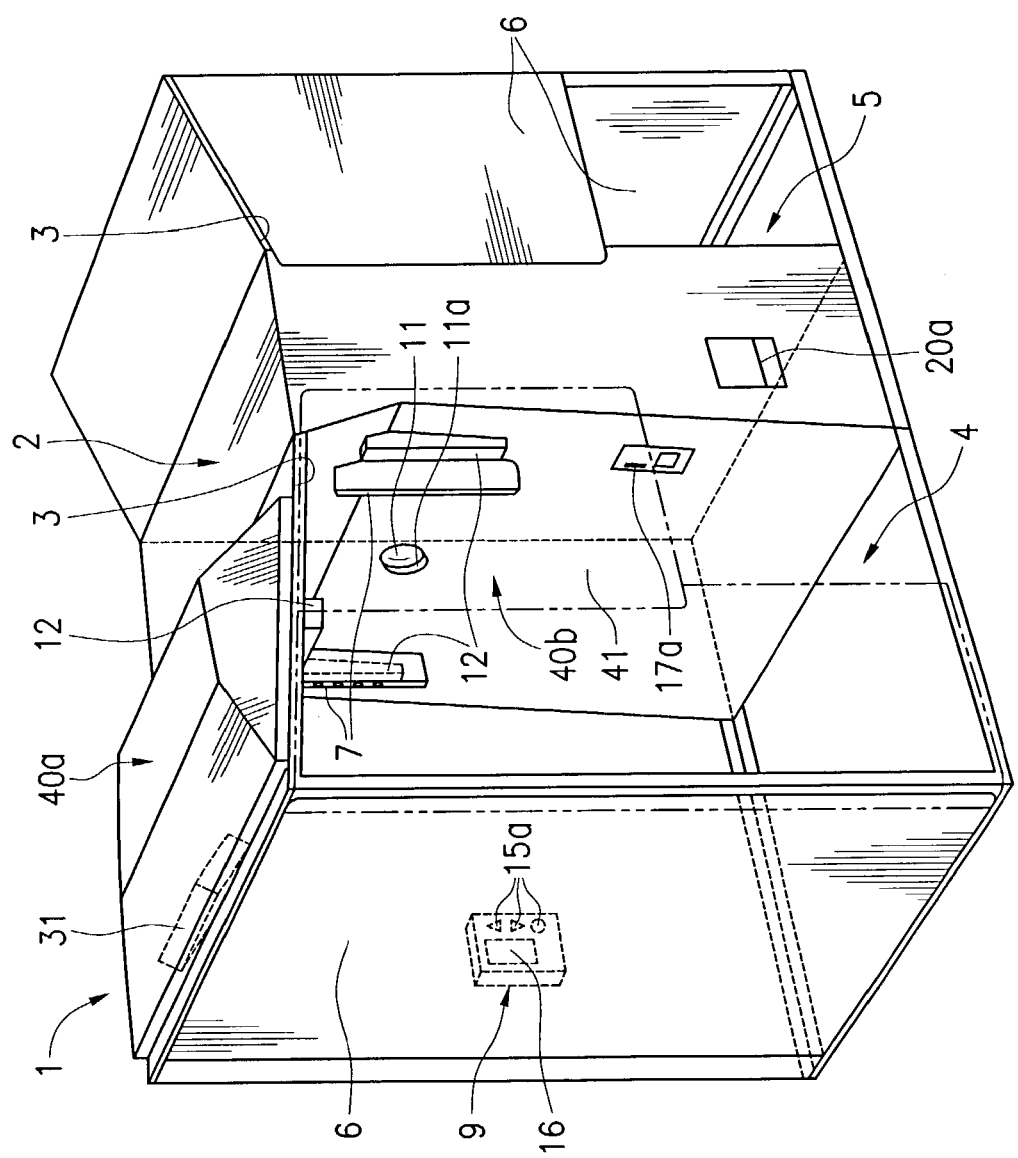
FIG. 1 is a perspective view showing an outward appearance of an automatic photograph seal vending apparatus according to a first embodiment.

An explanation will be given below to embodiments of the invention and drawings.

First, an explanation will be given to an outward appearance of an automatic photograph seal vending apparatus 1 according to a first embodiment with reference to a perspective view shown in FIG. 1.

The automatic photograph seal vending apparatus 1 is substantially composed of a frame 3 enclosing a photographing space 4, an editing space 5, an enclosure 2 provided between the photographing space 4 and the editing space 5, and a black curtain 6, which is suspended from an upper side of the frame 3 to enclose the photographing space 4 and the editing space 5, respectively.

A roof illumination box 40a is provided in an upper portion of the photographing space 4, and fluorescent lamp illumination devices 12 with an illuminating direction downward are provided centrally downward in the roof illumination box 40a to extend in a longitudinal direction.

As shown in FIG. 8(C) described later, the roof illumination box 40a is composed of an upper portion formed by a hood-shaped reflection plate 43, of which an inner surface thereof is coated white; a lower portion formed by a white, translucent diffusion plate 42 for diffusion and transmission of light; and an inner portion having mounted therein strobe illumination devices 13 for irradiation of light upward in a front side. Illumination light of the strobe illumination devices is reflected by the reflection plate and diffused by the diffusion plate 42 to illuminate an interior of the photographing space 4 substantially uniformly toward a front side slightly from above.

Provided on an underside of the roof illumination box 40a on a front side is a projector 31 shown by shadow lines in FIG. 1, the projector 31 sending out light on a white plate 41, which is provided on a front of the enclosure 2, to project a picture image, thus allowing a user to ascertain his posture at the time of photographing.

Provided inside of a left side of the photographing space 4 is an operation box 9, in which are arranged remote operation buttons 15a capable of input such as setting of zoom of a digital camera 11 and the start of countdown at the time of photographing even when at a distance from the enclosure 2, and a guide monitor 16 for displaying a guidance of a photographing method. Provided in the operation box 9 are speakers (not shown) for guidance through sound together with guidance on the guide monitor 16.

The front of the enclosure 2 directed toward the photographing space 4 is covered by the white, translucent white plate 41 for diffusion and transmission of light, and the white plate 41 is generally inclined upward with only an upper portion thereof inclined downward so as to become dog-legged as viewed for a left side thereof.

The upwardly inclined portion of the white plate 41 is the portion on which a picture image projected from the projector 31 is imaged as described above, and a camera hole 11a is provided centrally of an upper portion of the white plate, the digital camera 11 is provided inside the white plate, partitions 7 are provided on right and left sides of the camera hole 11a, and fluorescent lamp illumination devices 12 are provided outside the partitions.

Figure 2:
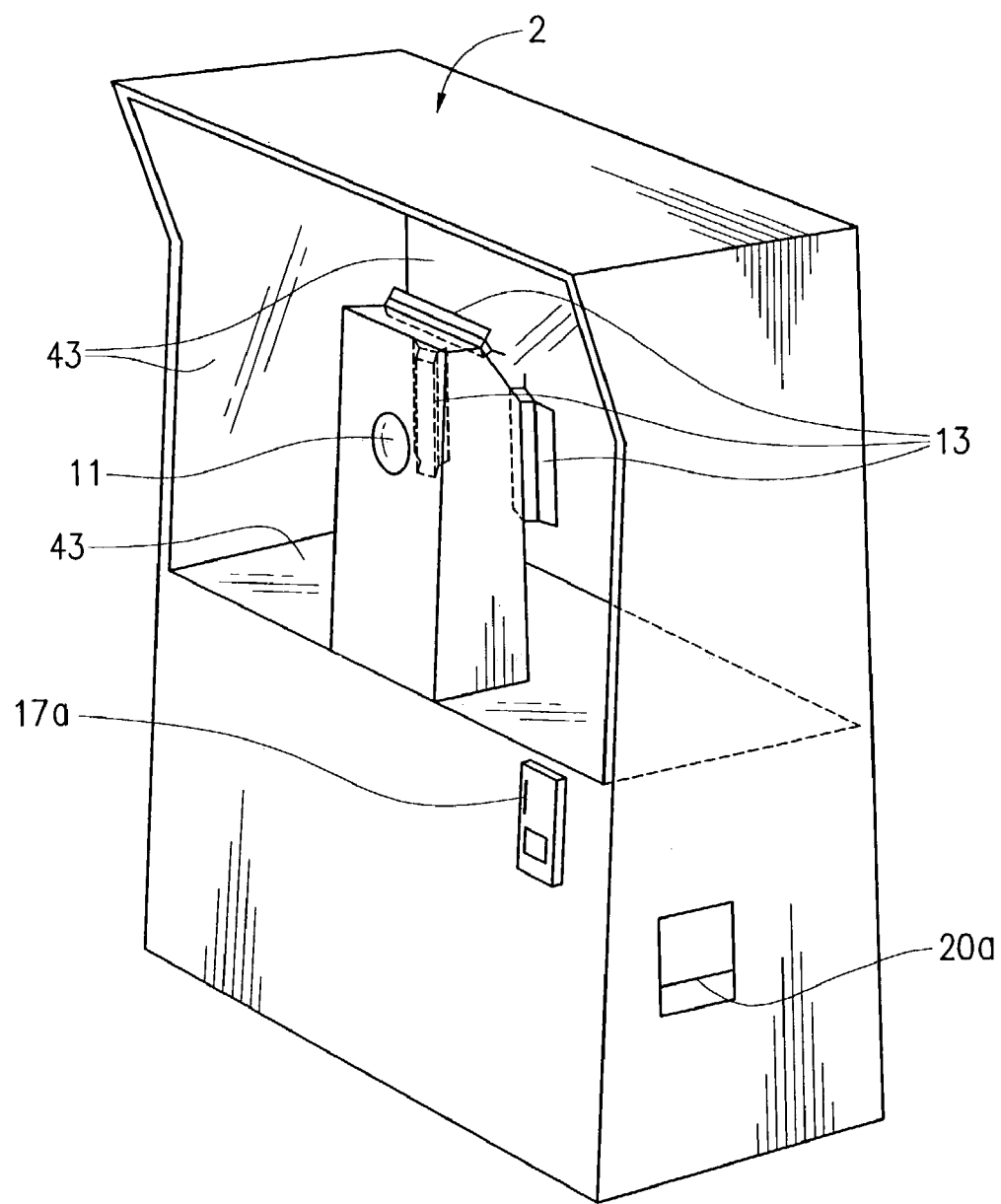
FIG. 2 is a perspective view showing an interior of a front illumination box of the automatic photograph seal vending apparatus.

An upper half of an interior of the enclosure 2 is box-shaped with a front thereof opened, and respective surfaces except the front surface are defined by the reflection plates 43 as shown in FIG. 2.

Strobe illumination devices 13 are provided behind the digital camera 11 provided centrally of the front side, such that two of the strobe illumination devices 13 irradiate rightwardly and leftwardly outward on a back side and one of the strobe illumination devices irradiates upward on the back side.

A front illumination box 40b (FIG. 1) composed of the strobe illumination devices 13, the white plate 41 (FIG. 1), and the reflection plates 43 is constructed such that illumination light of the strobe illumination devices 13 is reflected by the reflection plates 43 and diffused by the white plate 41 to illuminate a subject substantially uniformly.

As shown in FIG. 1, a coin slot 17a for depositing a coin or coins is provided rightwardly downwardly of the white plate 41, and a seal discharge port 20a for discharging of a photograph seal 8c (FIG. 3) is formed in a lower portion on a right side of the enclosure 2.

Figure 3:
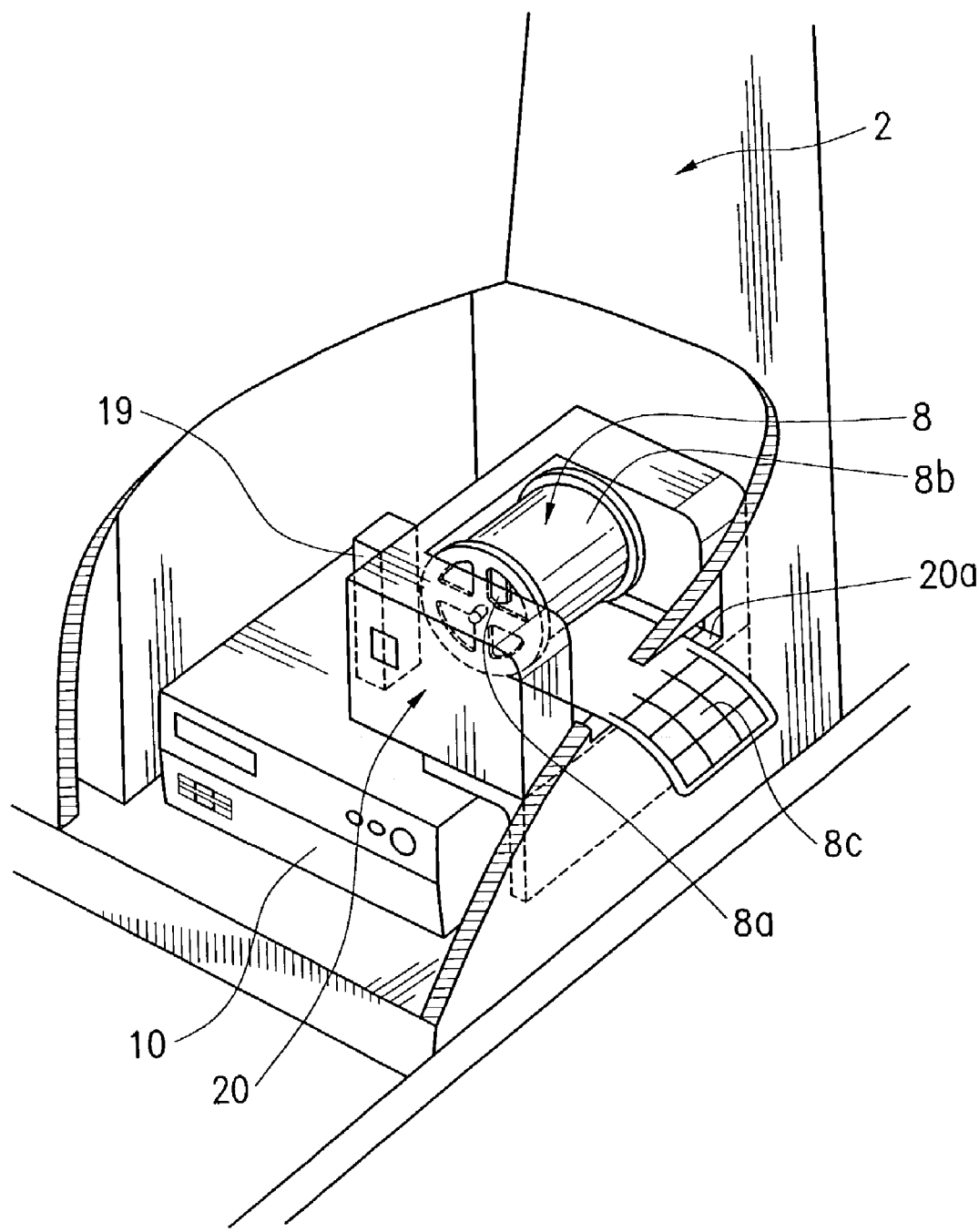
FIG. 3 is a partially enlarged view (partially cross sectional view) showing an interior of an enclosure of the automatic photograph seal vending apparatus.

As shown in a partially enlarged view (a partially cross sectional view) of FIG. 3, a control device 10 composed of a personal computer is provided rightwardly downward in the enclosure 2 and near the seal discharge port 20a and a printer 20 is provided on the control device.

A seal paper unit 8 is set on the printer 20 and composed of a roll of seal paper 8b and an ID tag 8a, in which data such as identification data or the like are stored to identify whether the seal paper 8b is genuine.

Provided behind the printer 20 is an ID tag reader/writer 19 to read the data stored in the ID tag 8a.

Figure 4:
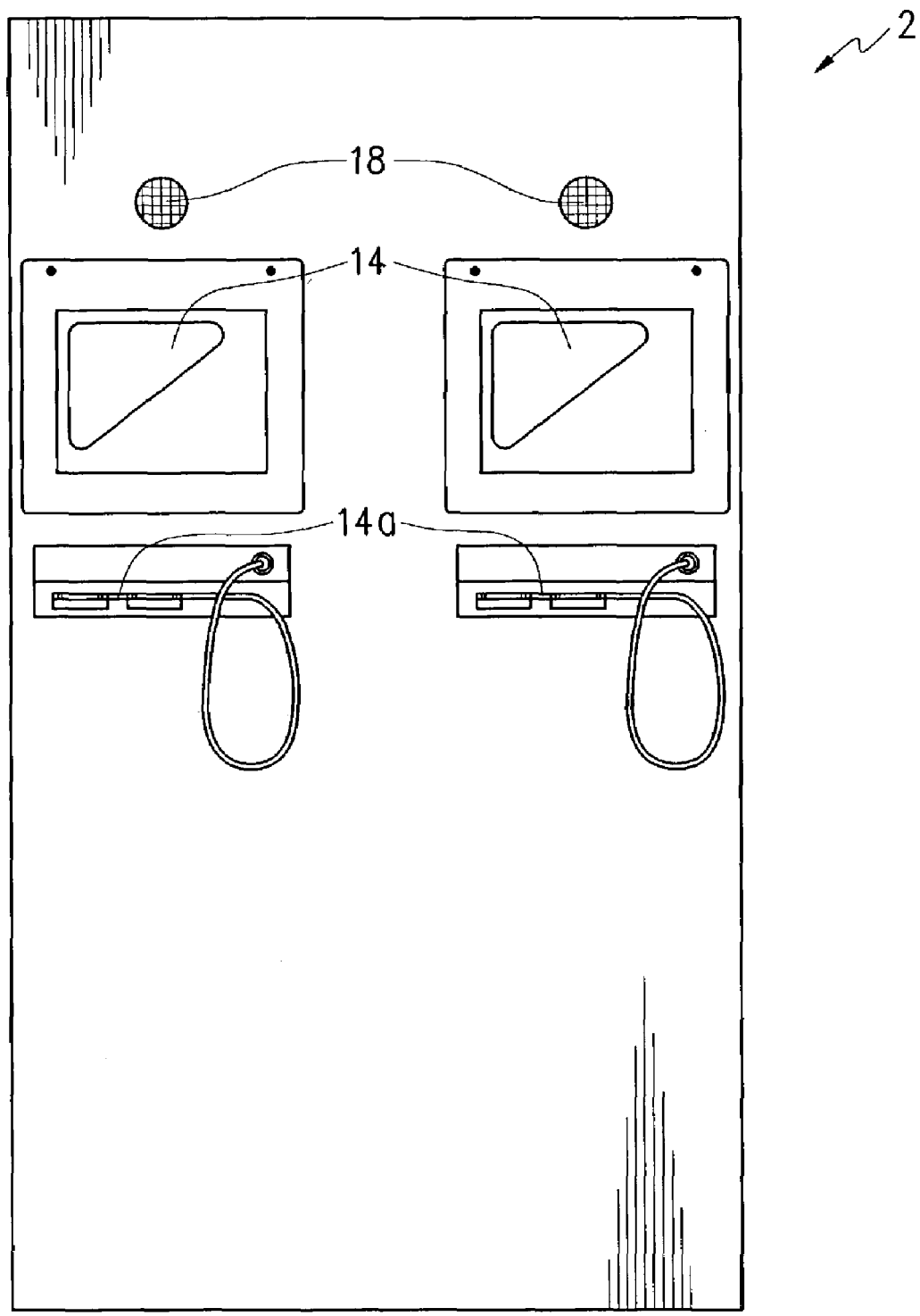
FIG. 4 is a back view showing an outward appearance of the enclosure of the automatic photograph seal vending apparatus.

As shown in a back view of the enclosure 2 shown in FIG. 4, provided right and left on a back surface of the enclosure 2 are speakers 18, touch monitors 14, and touch pens 14a, in a descending order; the speakers 18 making a necessary announcement and the touch pens 14a allowing a user to make input thereon for editing of scribble.

With the above arrangement of the automatic photograph seal vending apparatus 1, the projector 31 (FIG. 1) projects a picture image of a subject on the white plate 41 at the time of setting posture before photographing to provide a preview display (displaying of motion picture), the above projection is suspended at the time of photographing to permit the roof illumination box 40a and the front illumination box 40b to substantially uniformly illuminate a subject for photographing, and the projector 31 projects the photographed picture image on the white plate 41 for displaying of a still picture. After the photographing is terminated, a user is invited to move to the editing space and allowed to touch the touch monitors 14 with the touch pens 14a for editing of scribble, and the edited picture image is printed to cause a photograph seal sheet 8c to be discharged.

An explanation will be given below to the construction of the automatic photograph seal vending apparatus 1 with reference to a circuit block diagram shown in FIG. 5.

The automatic photograph seal vending apparatus I comprises the control device 10 provided with a CPU, ROM and a RAM to perform control operation of various devices, the digital camera 11 connected to the control device 10, the fluorescent lamp illumination devices 12., the strobe illumination devices 13, the touch monitors 14, a remote operation device 15, the guide monitor 16, a coin handling device 17, the speakers 18, the ID tag reader/writer 19, the printer 20, the projector 31, and a storage device 51.

The control device 10 performs control operation of various devices as described above, and causes the projector 31 to project a picture image prior to the photographing, the control device also performs a process of suspending photographing of a picture image at the time of photographing (at the time of shuttering).

The digital camera 11 receives a shutter signal from the control device 10 to perform photographing and transmits to the control device 10 picture image data such as photographed motion picture data and photographed still picture data.

In accordance with an illumination control signal from the control device 10, the fluorescent lamp illumination devices 12 continuously illuminate an interior of the photographing space 4 brightly at least for a period of time from the start of play caused by depositing of a coin or coins to termination of photographing, thereby providing a quantity of light required for operation and confirmation of posture by a user.

In accordance with an illumination control signal from the control device 10, the strobe illumination devices 13 performs strobe emission to brightly and instantaneously illuminate a subject at the time of photographing, thus ensuring a quantity of light required for photographing.

The touch monitors 14 receive a RGB signal from the control device 10 and in accordance with the signal, display picture images such as the photographed picture image taken by the digital camera 11, edited picture images for editing of scribble, or the like. Also, when a user uses the touch pens 14a (FIG. 4) to input an instruction for editing of scribble, or the like, coordinates as touched are transmitted as an input signal to the control device 10.

When the three remote operation buttons 15a (FIG. 1) are depressed by a user, the remote operation device 15 accepts a switching operation of photographing a face up or photographing an entire body and an operation of starting countdown for photographing, and when a user depresses one of the remote operation buttons 15a, its input signal is transmitted to the control device.

The guide monitor 16 is one for displaying guidance as to a method of photographing, and displays picture images such as letters, figures or the like in accordance with the RGB signal from the control device 10.

The coin handling device 17 is provided inside the above coin slot 17a to discriminate genuineness and kind of a coin or coins deposited to transmit the number of coins deposited as a number information to the control device 10. In addition, such depositing of coins constitutes a start signal for the sale process.

In accordance with a sound signal from the control device 10, the speakers 18 announce countdown and a remaining time to a user at the time of photographing.

The ID tag reader/writer 19 reads data stored in the ID tag 8a provided on the seal paper unit 8 by means of a read signal, and updates the data by means of an update signal. Thereby, the update process is implemented to discern whether the seal paper unit 8 is genuine and whether the count number, which is the number of printing, should be overwritten.

The printer 20 receives print picture image data from the control device 10, prints the received print picture image on the seal paper 8b of the seal paper unit 8 (FIG. 3), and discharges the created photograph seal sheet 8c.

The projector 31 operates in accordance with a control signal from the control device 10, and projects a picture image in accordance with a RGB signal to reflect a picture image, such as a live view picture image before photographing, photographed picture image or the like, on the white plate 41, on which projection is made.

The storage device 51 writes and stores setting information received from the control device 10 and transmits the stored setting information to the control device 10 at the time of reading.

With the above arrangement, the control device 10 transmits a RGB signal to the projector 31 to cause the same to project a picture image to reflect the same on the white plate 41, and suspends projection of the projector 31 at the time of photographing to cause emission of the strobe illumination devices 13 to substantially uniformly illuminate a subject in an adequate luminous intensity, thus carrying out photographing with the digital camera 11.

Figure 6:
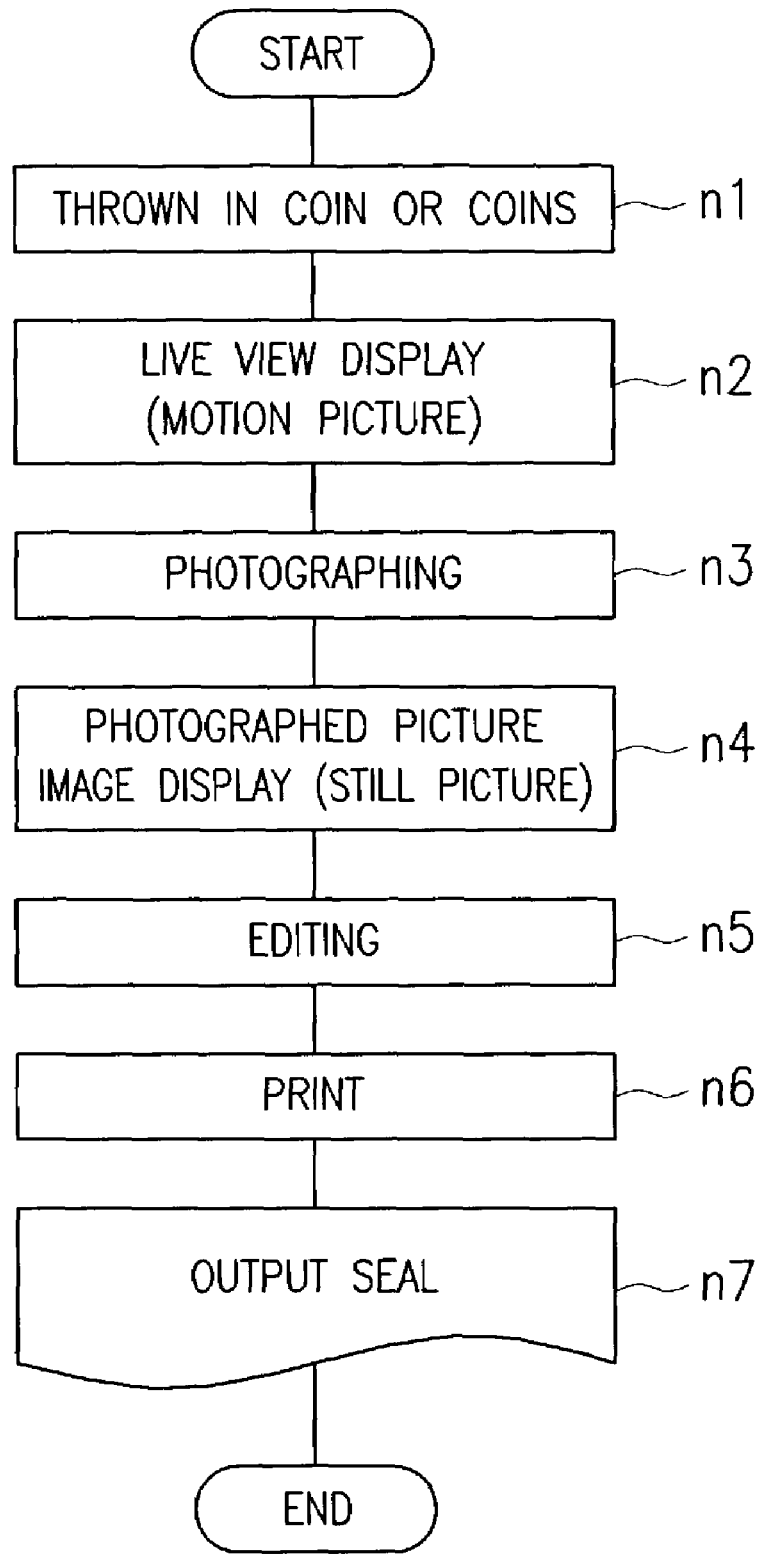
FIG. 6 is a flowchart showing an operation of the automatic photograph seal vending apparatus.

Below is an explanation of a process described by the flowchart shown in FIG. 6. Also an explanation of the operation of the control device 10 of the automatic photograph seal vending apparatus 1 will be provided with reference to FIGS. 7, 8 and 9.

When a user deposits a coin or coins into the coin slot 17a, the control device 10 receives a start signal from the coin handling device 17 to start the sale process (play) (STEP n1). At this time, the control device 10 transmits an illumination control signal to the fluorescent lamp illumination devices 12 thereby increasing the fluorescent lamp illumination devices 12 in luminous intensity to brighten the photographing space 4.

The control device 10 receives picture image data of motion pictures from the digital camera 11 to transmit the picture image data to the projector 31 by way of a RGB signal to project a subject (user) on the white plate 41, thus implementing live view displaying and flickering the remote operation buttons 15a (STEP n2).

Figure 7A:
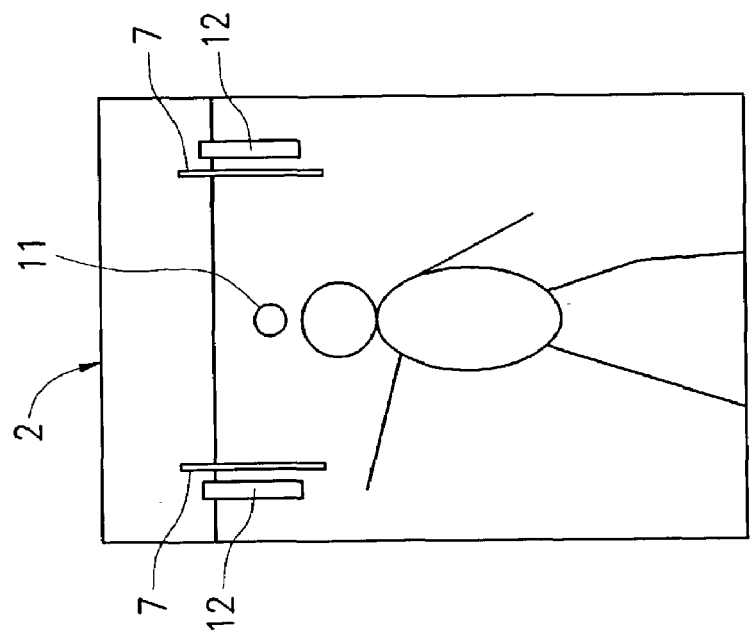
FIG. 7 is a view illustrating an operation of the automatic photograph seal vending apparatus.
Figure 7B:
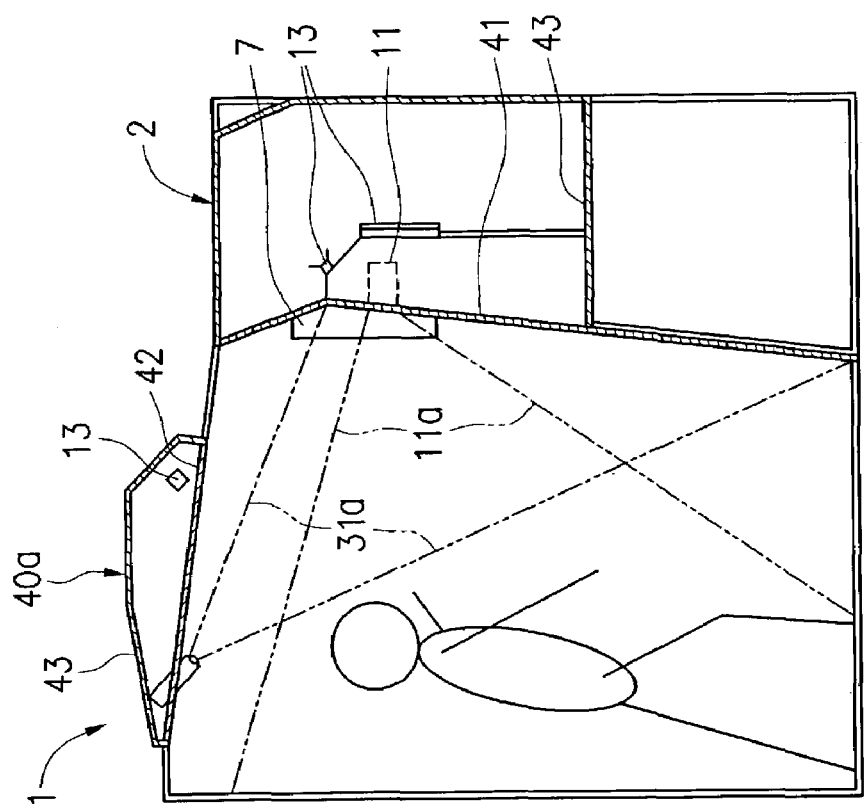

At this time, as shown in the operation illustration of the automatic photograph seal vending apparatus 1 shown in FIGS. 7A–7B the digital camera 11 is photographing a range shown by imaginary lines 11a in the right side view (FIG. 7A) and the projector 31 is projecting a picture image on the whit plate 41 in a range shown by imaginary lines 31a to perform live view displaying as shown in the front view (FIG. 7B).

After checking details, such as posture, untidiness of hair, or the like, in the live view display, a user uses the remote operation buttons 15a to instruct the start of photographing. After receiving an input signal from the remote operation device 15, the control device 10 causes the digital camera 11 to perform photographing (STEP n3).

At this time, the control device 10 suspends transmitting of a RGB signal to the projector 31 and in synchronism with shuttering of the digital camera 11 causes emission of the strobe illumination device 13 as shown by arrows of imaginary lines in the right side view and front view in the operation illustration of the automatic photograph seal ending apparatus 1 shown in FIGS. 8A and 8B, thus using the white plate 41, which has been used as a screen for photographing of picture images in the above live view, as a diffusion plate for diffusing illumination light of the strobe illumination devices 13.

Having received a photographed picture image as picture image data from the digital camera 11, the control device 10 transmits the picture image data as RGB data to the projector 31 to project the photographed picture image onto the white plate 41 for still picture displaying, thus permitting a user to ascertain the photographed picture image (STEP n4).

Figure 9B:
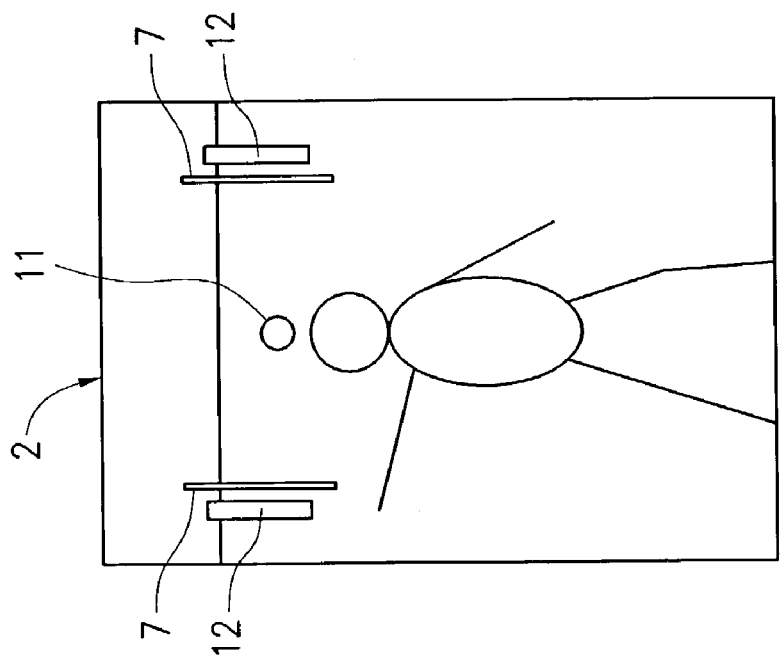
FIG. 9 is a view illustrating an operation of the automatic photograph seal vending apparatus.
Figure 9A:
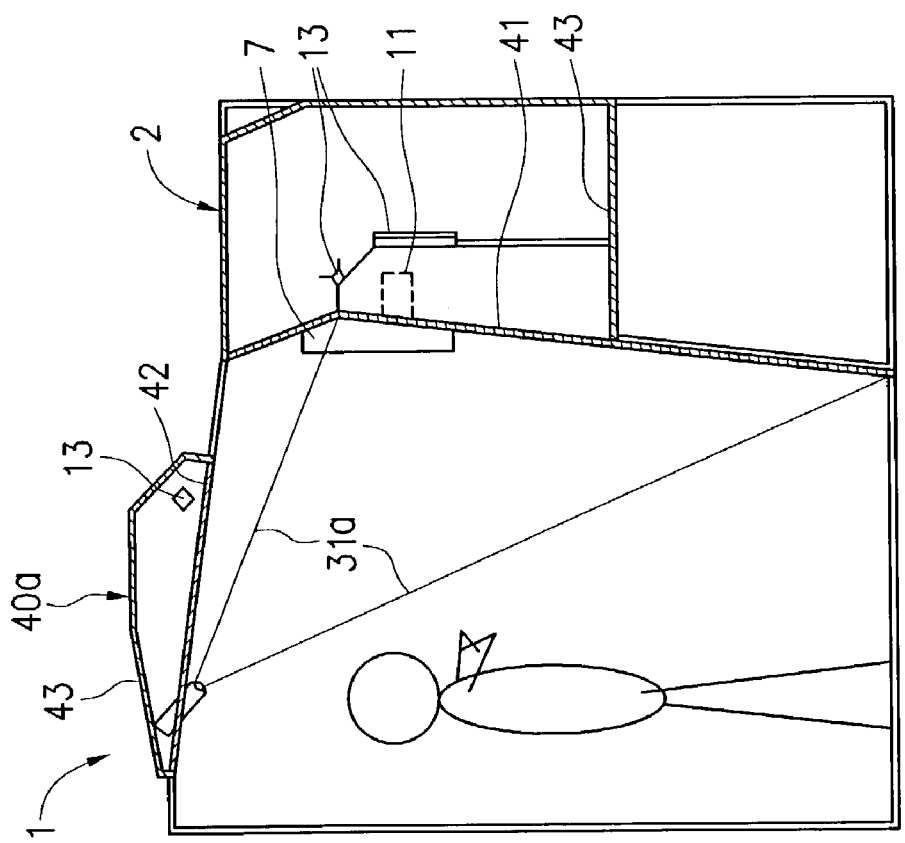

At this time, the projector 31 causes still picture displaying of the photographed picture image, as shown in the front view (F), on the white plate 41 in a range indicated by the imaginary lines 31a as shown in the operation illustration shown in the right side view (E) of FIG. 9.

When photographing is terminated, displaying made by the projector 31 and the white plate 41 informs a user to move to the editing space 5 from the photographing space 4 to perform editing of scribble, and allows a user to touch the touch monitors 14 with the touch pens 14a to perform the editing process of the photographed picture image (STEP n5).

Here, editing means display the operation on the touch monitors 14, a menu screen for various scribble, and the photographed picture image on the touch monitors 14. A user selects an operation button on the menu screen to be able to make scribble on the photographed picture image with the use of the touch pens 14a, thus enabling an operation of making the picture image process of the photographed picture image with the use of items such as color pen, color stamp, or the like and arranging a picture image for synthesized stamps on a fundamental background picture image for synthesizing. In addition, the touch monitors 14 display a remaining time (elapsed time) during the editing of scribble.

The control device 10 causes the printer 20 to print the above edited picture image (the photographed picture image in the case where a user does not make editing, or both the photographed picture image and the edited picture image) on the seal paper 8b (STEP n6), and discharges the created photograph seal sheet 8c from the seal discharge port 20a (STEP n7) to terminate the process.

Through the above processes, a user can perform photographing adequately ascertaining his photographing posture and details prior to photographing in a live view, in which one picture image free of disconnected portions is shown in large display. A user may also ascertain details, such as expression and untidiness of hair and clothes, after photographing because the photographed picture image is likewise displayed in large display.

Also, while a picture image of a subject projected onto the white plate 41 is displayed in a size smaller than life-size in the above embodiment, display can be said to be substantially life-sized as compared with displays in conventionally existing cathode-ray tube displays and liquid crystal displays, and, therefore, it is possible to adequately ascertain details even without approaching a picture image displayed. Further, in the case of photographing a head, even details can be ascertained because it is possible to present an enlarged display in a size equal to or larger than life-size.

Also, a subject can be illuminated substantially uniformly from a front thereof by a light source of wide area in the front illumination box 40b, whereby it is possible to avoid problems like insufficiency of light and emphasis on contrast caused by strobe illumination, and to photograph a subject prettily.

Also, since the partitions 7 are configured to prevent illumination light of the strobe illumination devices 12 from illuminating the white plate 41, it is possible to make the white plate 41 and its neighborhood dark at the time of live view displaying and displaying of the photographed picture image. Thereby, imaging on the white plate 41 of a picture image projected from the projector 31 can be improved in visibility while a quantity of light required for photographing a subject in motion picture with the use of the digital camera 11 is ensured.

Also, since the curtain 6 is black, it can absorb light from outside the photographing space 4 and suppress reflection of illumination light of the strobe illumination devices 12, thus improving visibility for live view displaying and displaying of the photographed picture image and displaying (imaging) the picture image clearly.

In addition, the above first embodiment may be configured to install the projector 31 on a floor surface spaced a little toward the front side from the front of the enclosure 2 and to make the white plate 41 vertical in a manner to have the projector 31 projecting a picture image onto the white plate 41 from under; or to install a reflector, a mirror surface of which faces upward on the back surface side, in a position of the projector 31 and to arrange the projector 31 centrally of a lower portion of the front of the enclosure 2 such that a picture image projected from the projector 31 is reflected by the reflector to be projected onto the white plate 41.

Thereby, when a user comes close to the white plate 41, live view may still be ascertained without obstruction by shadow, and so a user can ascertain live view while freely posing himself nearer to the front side than the projector 31 or the reflector.

Also, the projector 31 may project a picture image onto a central portion of the white plate 41, and its neighborhood may serve as a diffusion plate for diffusing illumination light of the strobe illumination devices 13. With such an arrangement, the central portion of the white plate 41, onto which a picture image is projected, can be made translucent and a picture image projected from the projector 31 can be displayed more clearly than before.

Also, the entire enclosure 2 may be configured to serve as the front illumination box 40b so that the entire white plate 41 emits light at the time of photographing. Thereby, a quantity of light is increased to be able to illuminate a subject substantially uniformly and brightly.

Next, an explanation will be given to a second embodiment with reference to a perspective view of the enclosure 2 shown in FIG. 10 and an operation illustration of the automatic photograph seal vending apparatus 1 shown in FIG. 11.

Figure 10:
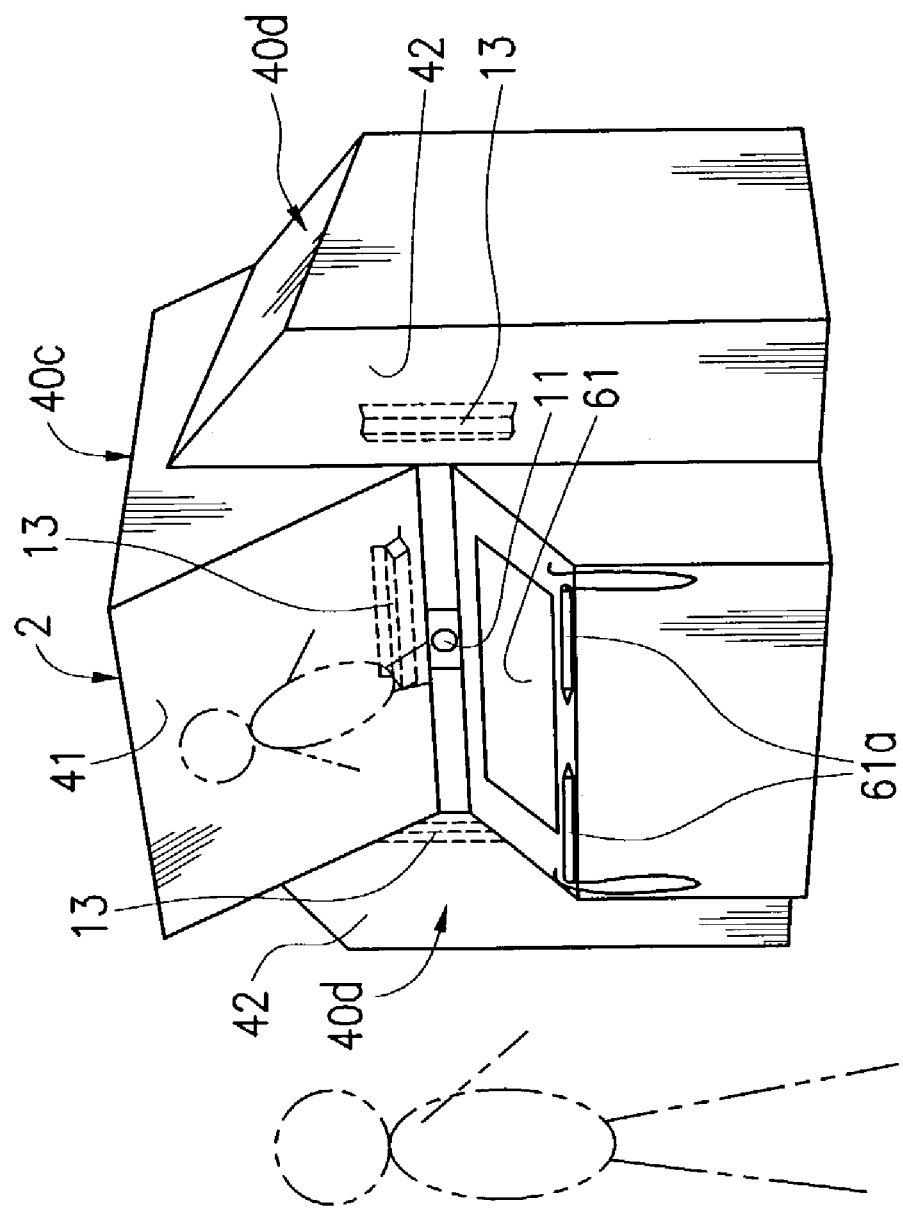
FIG. 10 is a perspective view showing an outward appearance of an enclosure in a second embodiment.

Referring to FIG. 10, in this embodiment, a white plate 41 inclined downward toward a front side is provided in an upper portion of an enclosure 2, an upper illumination box 40c is constituted by the white plate 41, a reflection plate 43 (FIG. 9A) and strobe illumination devices 13, a subject is illuminated in the upper illumination box 40c at the time of photographing, and a photographed picture image is projected on the white plate 41.

A digital camera 11 is provided centrally of a front of the enclosure 2, and a digitizer 61 inclined upward toward the front side is provided below the digital camera. The digitizer 61 detects a position touched touch pens 61a, which are provided in the vicinity of the digitizer, and transmits its input signal to a control device 10 (FIG. 3) to allow input of editing of scribble or the like. In addition, at the time of editing scribble, positions of the touch pens 61a relative to the photographed picture image are projected onto the white plate 41, so that a user can perform editing of scribble while ascertaining the picture image projected onto the white plate 41.

Diffusion plates 42 are arranged on both sides of the enclosure 2, and the diffusion plates 42, the reflection plate 43, and the strobe illumination devices 13 constitute side illumination boxes 40d.

Figure 11:
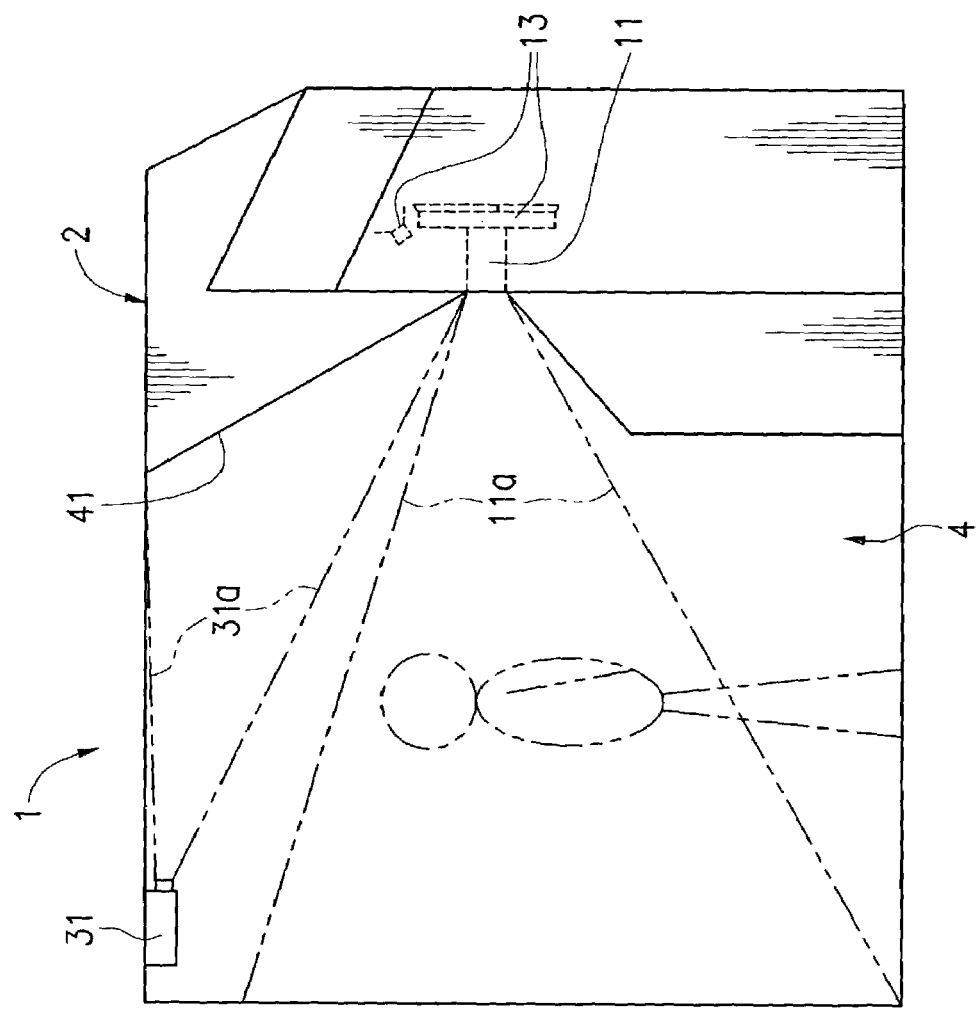
FIG. 11 is a right side view showing an automatic photograph seal vending apparatus according to a second embodiment.

In this embodiment, since the process for editing scribble is carried out in a photographing space 4, the editing space 5 in the previous embodiment is not provided, and an automatic photograph seal vending apparatus 1 is constituted by the photographing space 4 and the enclosure 2 as shown in the operation illustration shown in FIG. 11.

The digital camera 11 photographs a range shown by imaginary lines 11a and transmits its picture image data to the control device 10.

A projector 31 is provided in an upper portion of the photographing space 4 toward the front to project a picture image onto the white plate 41 for imaging as shown by imaginary lines 31a.

Figure 5:
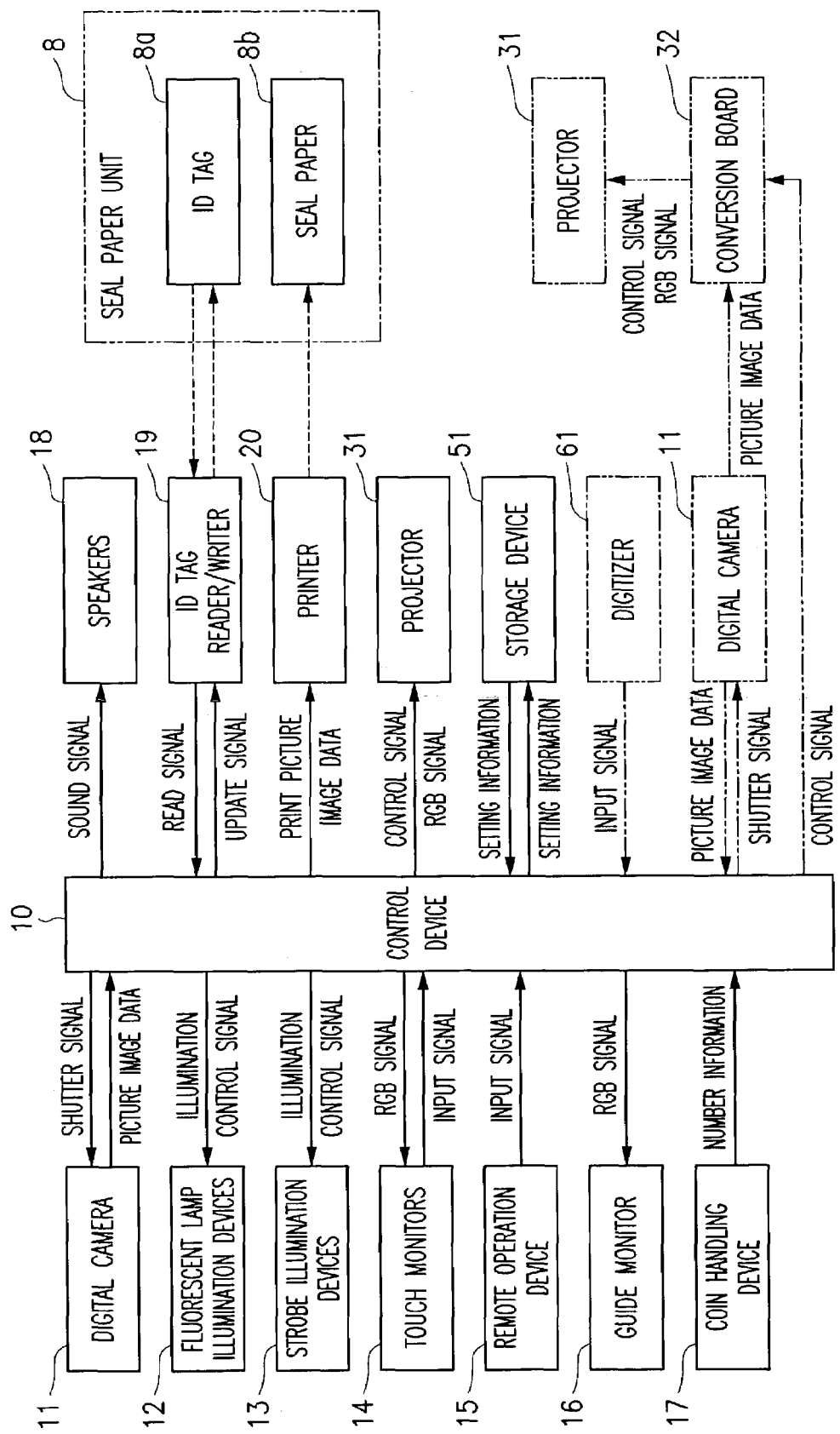
FIG. 5 is a block diagram showing a control circuit of the automatic photograph seal vending apparatus.

With the second embodiment described above, the digitizer 61 is connected to the control device 10 as shown by imaginary lines in the circuit block diagram illustrated in FIG. 5, and coordinates touched by a user are transmitted as an input signal to the control device 10 by the digitizer 61. In addition, since editing of scribble is made possible with the arrangement, the touch monitors 14 described above are dispensed with.

Thereby, even when approaching the digital camera 11 more closely than in first embodiment above, a user can ascertain his live view on the white plate 41 without obstruction by his shadow, increasing a user's freedom when photographing.

In addition, with the present embodiment, other constitution, construction and operation are the same as those in the first embodiment, and so the same elements are denoted by the same reference numerals, a detailed explanation therefore being omitted.

Figure 12:
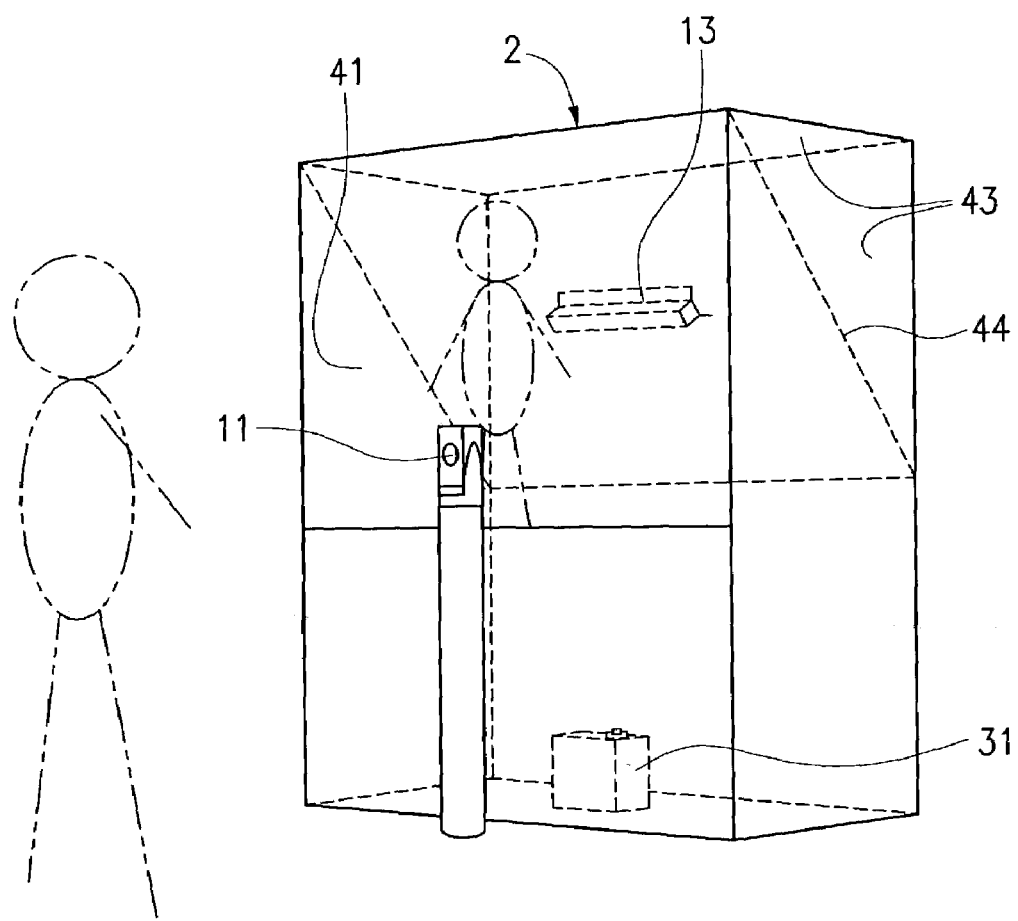
FIG. 12 is a perspective view showing an outward appearance of an enclosure in a third embodiment.

Next, an explanation will be given to a third embodiment with reference to a perspective view of an enclosure 2 shown in FIG. 12.

In this embodiment, white plates 41 define an upper half of the box-shaped enclosure 2, in which a half mirror 44 with a mirror surface thereof directed downward toward a front side is provided and a strobe illumination device 13 is provided behind the half mirror 44 to illuminate upward toward a back surface.

Inner walls of the enclosure 2 are formed by reflection plates 43, so that illumination light of the strobe illumination device 13 is reflected by the reflection plates 43 to transmit through the half mirror 44 to be diffused by the white plates 41, thus illuminating a subject substantially uniformly.

A projector 31 is provided centrally on a bottom of the enclosure 2 to project a picture image upward, and a picture image projected by the projector 31 is reflected by the half mirror 44 to be projected onto the white plates 41.

The digital camera 11 is provided in the front side of the enclosure 2 at a level amounting to a height of an average person's waist to afford facing upward and swinging right and left.

Also, provided on back and side surfaces of the enclosure 2 in the same manner as in the first embodiment are touch monitors 14, touch pens 14a, speakers 18, and a seal discharge port 20a.

With the present embodiment, other constitution, construction and operation are the same as those in the first embodiment, and so the same elements are denoted by the same reference numerals, a detailed explanation therefore being omitted.

With the above constitution, construction and operation, a picture image photographed by the digital camera 11 is transmitted as picture image data to the control device 10, and having received a RGB signal from the control device 10, the projector 31 projects the photographed picture image to cause the same to be reflected by the half mirror 44, the photographed picture image thus reflected being projected onto the white plates 41.

Thereby, a user approaches the white plates 41 to be able to ascertain the photographed picture image, so that even a user having weak sight can approach the white plates 41 and ascertain details and can ascertain his photographing posture by way of the white plates 41 without obstruction caused by his shadow even when posing for a photograph in any position.

In addition, in the respective embodiments, a large sized television may be provided as a display in place of the projector 31 and the white plates 41, and strobe illumination boxes may be provided separately.

Also, the digital camera 11 may be formed to be capable of digital zoom and optical zoom. Thereby, close-up photographing and whole body photographing are enabled even the subject is kept a certain distance from the digital camera 11.

Also, circuits for the digital camera 11 and the projector 31 may be constructed such that as shown by imaginary lines in FIG. 5, the digital camera 11 is connected to the control device 10 and the projector 31 is connected to the digital camera 11 via a conversion board 32.

In this case, the digital camera 11 transmits picture image data to the conversion board 32 as well as the control device 10. In accordance with a control signal from the control device 10, the conversion board 32 implements necessary converting process such as left-right reversal, vertical and horizontal conversion for the picture image data to transmit the same to the projector 31 as a RGB signal.

With such construction, it is possible to reduce load on the control device 10.

Also, even when the white plates 41 are not perpendicular to a direction of picture image projection of the projector 31, distortion may be removed from a picture image projected onto the white plates 41 by correcting the projected picture image of the projector 31 into a trapezoidal shape or an, inverted-trapezoidal shape.

Also, the projector 31 may be cut off from an electric source at the time of photographing instead of suspending projection of a picture image from the projector 31 at the time of photographing.

Also, the touch pens 14a may be provided on a side of the photographing space 4 to be capable of editing of scribble for a picture image projected onto the white plates 41. In this case, a position detecting sensor for detecting where on the white plates 41 are the touch pens 14a may be provided to transmit an input signal to the control device 10, and the white plates 41 may be formed by a large-sized touch monitor or a plurality of touch monitors. In the case of using such touch monitor or monitors, luminous intensity in illumination may be made up for by putting the touch monitor or monitors in white display at the time of photographing.

Also, the projector 31 may be configured to irradiate a picture image on the curtain 6 on the front or side surfaces so that the picture image imaged on the curtain 6 presents a live view display and a display of the photographed picture image.

Also, the curtain 6 is not limited to a black color but may be of other colors and may be formed from other members such as resin plates or the like.

Also, the digitizer 61 may be composed of a tablet to reduce cost.

Following is an explanation to a fourth embodiment. First, an explanation will be given to a constitution of an automatic photograph seal vending apparatus 101 with reference to a perspective view showing an outward appearance of the automatic photograph seal vending apparatus 101 shown in FIG. 13, a perspective view (partially cross sectional view) showing an outward appearance of an enclosure 102 shown in FIG. 14, a back view showing the enclosure 102 shown in FIG. 15, a side illustration of the enclosure 102 shown in FIG. 16, and a partially enlarged view (partially cross sectional view) showing an interior of the enclosure 102 shown in FIG. 17.

The automatic photograph seal vending apparatus 101 comprises a box-shaped frame 103, a central photographing space 104, an enclosure 102 provided that side (back side) of the photographing space, and a concealed space 105 provided this side (front side) of the photographing space 104 and enclosed by a specific curtain 218.

Provided further that side of the enclosure 102 is an editing space 106 for allowing a user to perform editing of scribble.

White curtains (not shown), inner surfaces of which are white, are suspended from an upper side of the frame 103 to be disposed on right and left portions and a front portion of the frame, the white curtains enclosing the photographing space 104 and the specific curtain 218 so as to make the same unseen from outside.

An explanation will be given first to the enclosure 102 among the above constituents. The enclosure 102 comprises a longitudinal screen 116p having a square shape as viewed from a front thereof and disposed in an upper portion of a front surface of the enclosure, a camera hole 114a (FIG. 14) formed in a portion a little above a center of the enclosure, and a digital camera 114 for photographing a subject, the digital camera being disposed to have its lens projecting from the camera hole 114a.

Provided around the screen 116p are an upper illumination box 115a disposed above the screen; a left illumination box 115b disposed on a left side of the screen; a right illumination box 115c disposed on a right side of the screen; and a lower illumination box 115d disposed on the bottom of the screen, the respective illumination boxes illuminating a subject in the photographing space 104 substantially uniformly.

Figure 14:
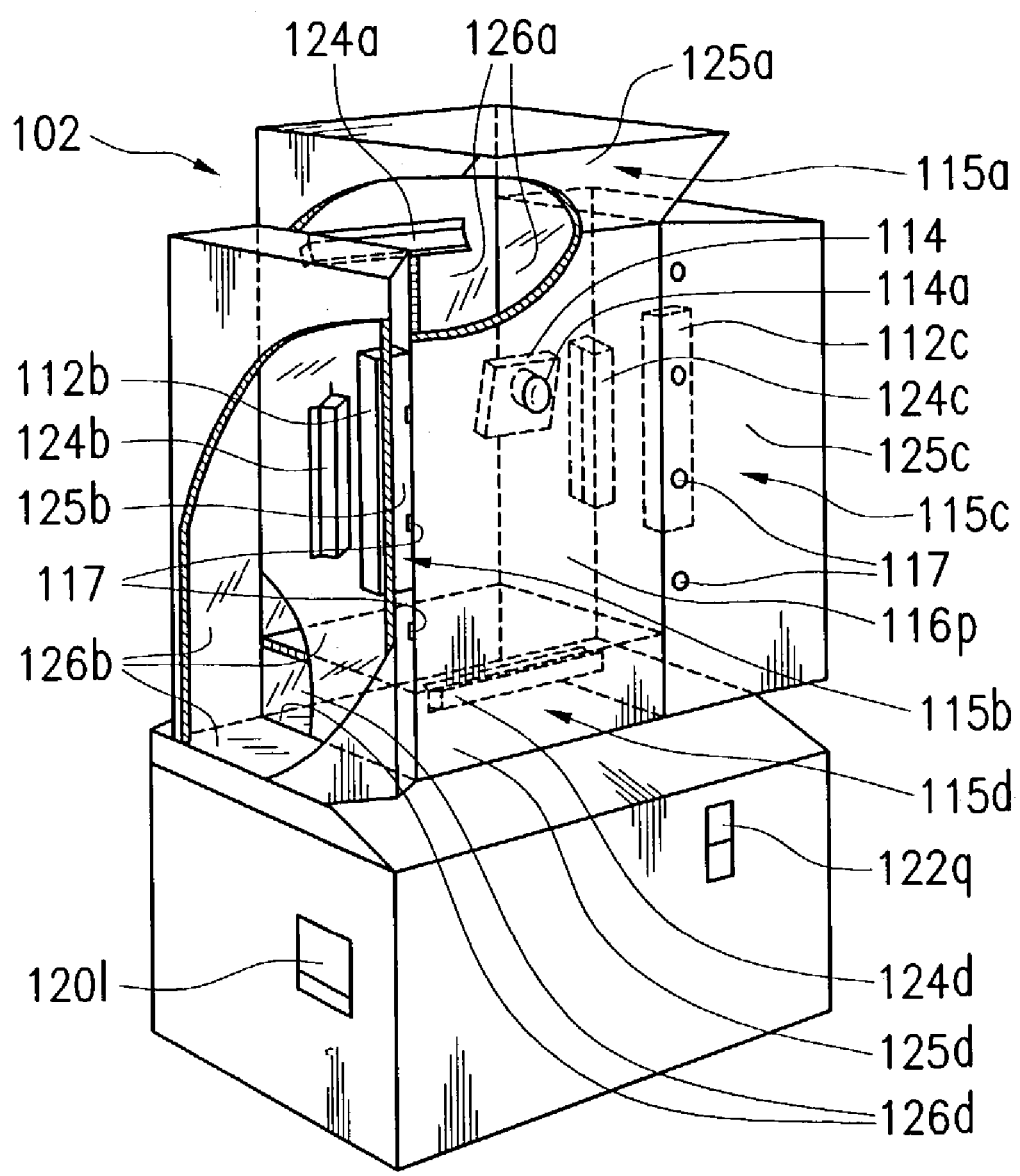
FIG. 14 is a perspective view (partially cross sectional view) showing an outward appearance of the enclosure of the automatic photograph seal vending apparatus.

As shown in a perspective view of the enclosure 102 in FIG. 14, the respective illumination boxes 115 are composed of strobe illumination devices 124 (124a, 124b, 124c, 124d) for strobe emission, diffusion plates 125 (125a, 125b, 125c, 125d) formed from a translucent material to diffuse light transmitting there through, and reflection plates 126 (126a, 126b, 126c, 126d) coated white to reflect light.

The upper illumination box 115a has mounted thereon the strobe illumination device 124a to make its direction of illumination upwardly and obliquely toward the front surface thereof, and the reflection plates 126a are provided on a back surface side, right and left sides, and a side toward a ceiling. The diffusion plate 125a is provided on the front surface side of the strobe illumination device 124a to be inclined downward, so that illumination light from the strobe illumination device 124a is reflected by the reflection plates 126a to be diffused by the diffusion plate 125a, thus illuminating a subject from upwardly and obliquely of that side.

The left illumination box 115b has mounted thereon the strobe illumination device 124b to make its direction of illumination laterally and obliquely (obliquely leftward) toward the back surface thereof, and the reflection plates 126b are provided on a back surface side, right and left sides, a side toward a ceiling, and a side toward a floor surface. The diffusion plate 125b is provided on the front surface side of the strobe illumination device 124b to be inclined inward (rightward), so that illumination light from the strobe illumination device 124b is reflected by the reflection plates 126b to be diffused by the diffusion plate 125b, thus illuminating a subject obliquely and inward (obliquely and centrally from the left side) from the left side.

In addition, a fluorescent lamp illumination device 112b is provided adjacent to the front surface side of the strobe illumination device 124b to illuminate the above photographing space 104 (FIG. 13) during the photographing process.

Also, four illuminated operation buttons 117 are provided longitudinally on the diffusion plate 125b to be disposed on a front surface side of the fluorescent lamp illumination device 112b, the buttons allowing input operations such as an operation of switching between close-up photographing and whole body photographing at the time of photographing, an operation of starting countdown of a shutter, an operation of selecting photographed picture images, or the like.

In addition, by positioning the illuminated operation buttons 117 (operating means) in the light emission surface of the left illumination box 115b (illumination means), the front surface (except the lower portion) of the enclosure 102 can be constituted by a display section (the screen 116p) and a light emission section (the illumination box 115).

Thereby, while preventing an increase in cost caused by forming the operating means (the illuminated operation buttons 117) separate from the enclosure 102, or providing touch monitors for the sake of a simple operation in the photographing process; the illumination means (the left illumination box 115b) can be formed to be made large in light emission area, thus enabling greater effective use of the front surface of the enclosure 102.

In addition, the illuminated operation buttons 117 (operating means) may be mounted outside the front surf ace side of the light emission surface of the left illumination box 115b (illumination means) or may be disposed adjacent to the left illumination box 115b (illumination means).

The right illumination box 115c is configured in left-right symmetry relative to the left illumination box 115b and so details thereof are omitted.

The lower illumination box 115d has mounted thereon the strobe illumination device 124d to make its direction of illumination downwardly obliquely toward the back surface thereof, and the reflection plates 126d are provided on a back surface side, right and left sides, a side toward the ceiling, and a side toward the floor surface. The diffusion plate 125d having a square shape as viewed from a front surface thereof is provided on the front surface side of the strobe illumination device 124d, so that illumination light from the strobe illumination device 124d is reflected by the reflection plates 126d to be diffused by the diffusion plate 125d, thus illuminating a subject upwardly and obliquely from a center thereof.

Figure 13:
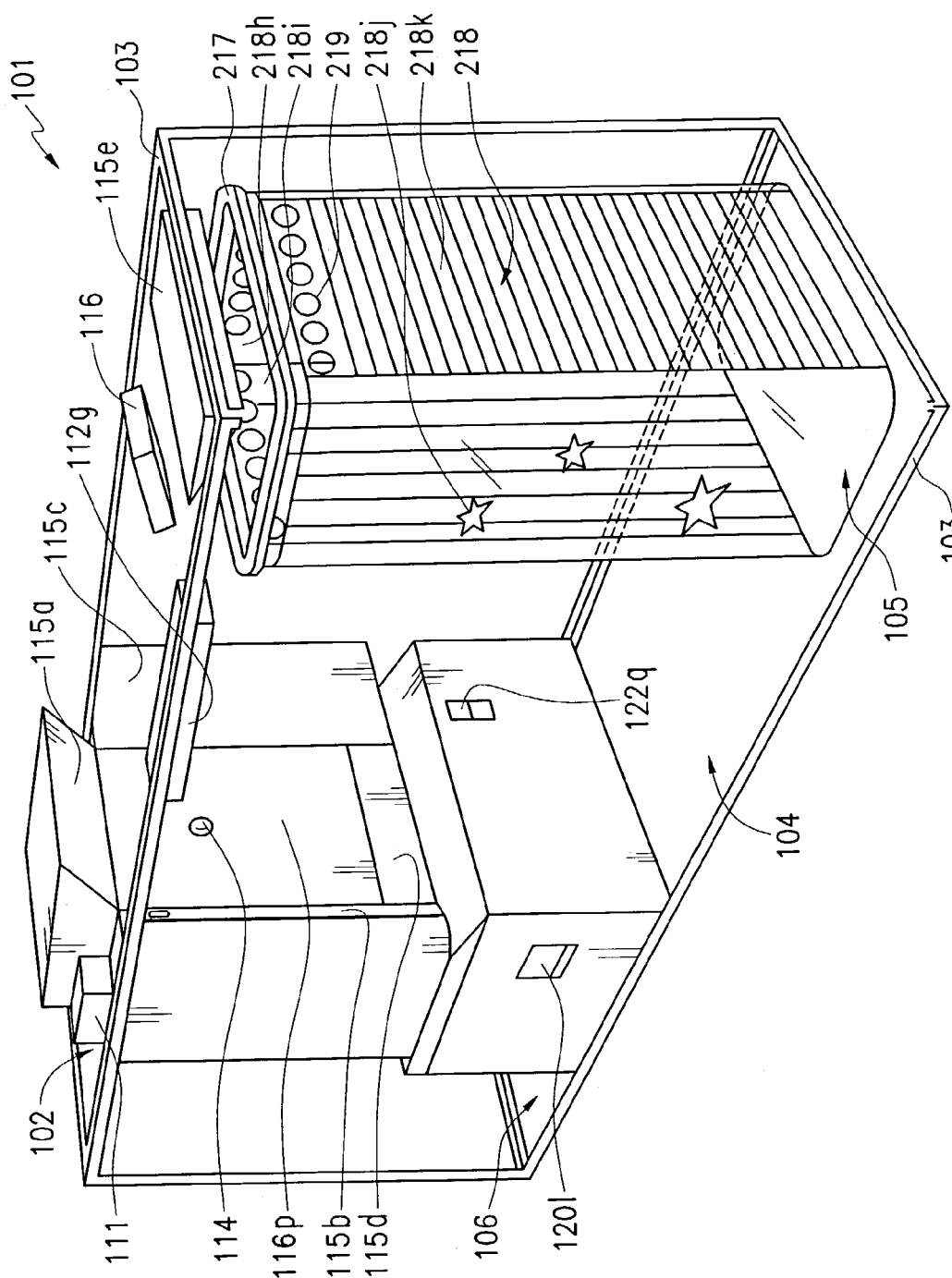
FIG. 13 is a perspective view showing an outward appearance of an automatic photograph seal vending apparatus according to a fourth embodiment.

As shown in FIG. 13, provided on a left side of an upper portion of the enclosure 102, that is, on an upper portion of the left illumination box 115b is a PHS unit 111 for performing data transfer through radio communications.

Figure 15:
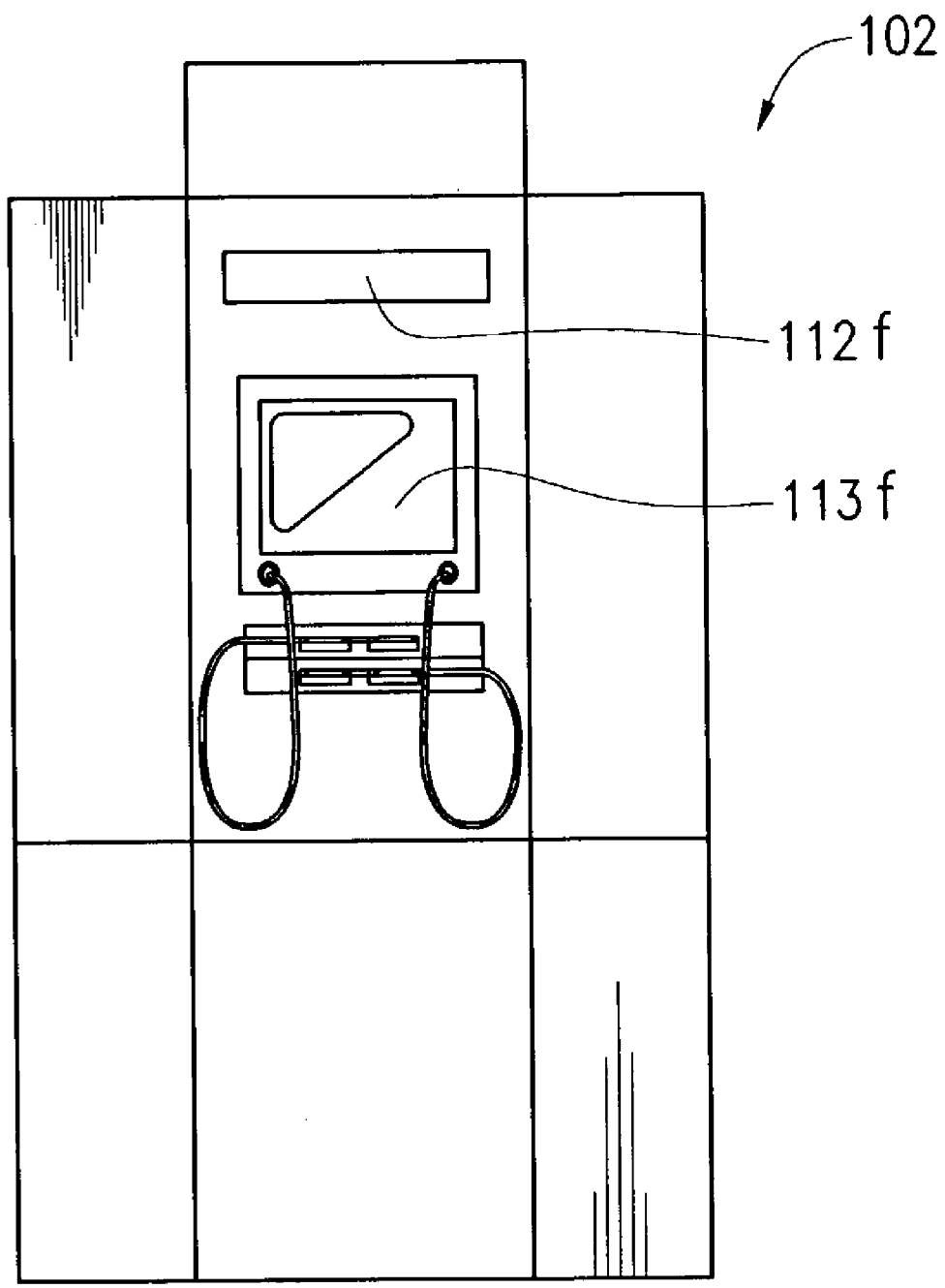
FIG. 15 is a back view showing an outward appearance of the enclosure.

Referring to FIG. 15, a fluorescent lamp illumination device 112f for illuminating the editing space 106 is provided on a back surface of the enclosure 102, and a touch monitor 113f for editing is provided below the illumination device to display a photographed picture image and items for editing and to allow a user to input scribbles. In addition, the touch monitor 113f is provided with two touch pens to allow two persons to input scribbles with the touch pens at the same time.

Figure 16A:
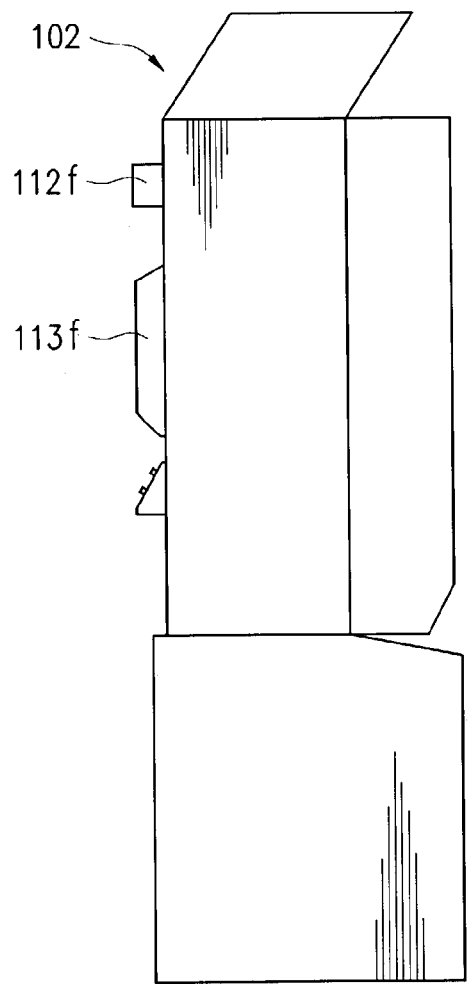
FIG. 16 is an illustration showing a side of the enclosure.
Figure 16B:
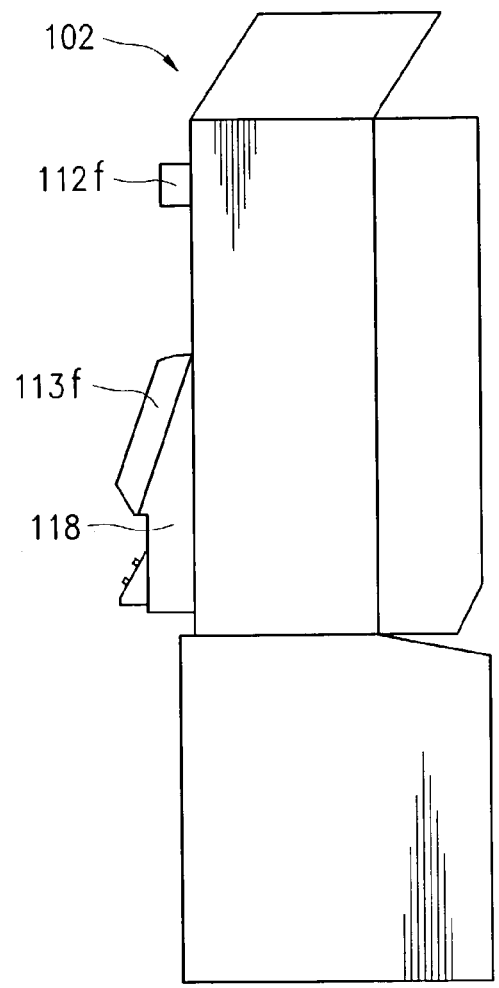

Here, while the touch monitor 113*f* editing is provided with its display surface vertical as shown in a side view of FIG. 16A, the touch monitor 113*f* can be screwed onto the enclosure 102 with a base 118 there between, as shown in FIG. 16B, to have its display surface inclined upward.

Thereby, a facility, in which the automatic photograph seal vending apparatus 101 is installed, can select a mount position of the touch monitor 113*f* for editing in conformity to a space. For example, the arrangement of FIG. 16A is selected where the facility is narrow, and the arrangement of FIG. 16B is selected where the facility is large.

Also, a user can perform editing of scribble easily even when he stands in a small space in front of the touch monitor 113*f* for editing with arrangement of FIG. 16A, and can perform editing of scribble in a comfortable posture with arrangement of FIG. 16B since the touch monitor 113*f* is positioned obliquely and downwardly of him.

In addition, the touch monitor 113*f* for editing may be of a tilt-type affording turning and/or sliding movement to afford changes in angle and/or position by one touch without labor intensive adjustment of the base 118, and may movable by means of drive means, such as motor or the like, so that adjustment in position and orientation is under the control of the control device 110.

In this manner, it is possible to accommodate facilities without a large installation space for the automatic photograph seal vending apparatus 101.

That is, by providing a display orientation modifying means such as the base 118, the tilt-type construction or the like, it becomes possible to modify a display orientation of display means according to a facility's space, or to modify a display orientation of display means (editing means such as the touch monitor 113*f* for editing) in conformity to a difference in body height between customers, so that freedom in installation space is increased to improve convenience for a user.

A coin slot 122*d* for depositing a coin or coins is provided on a right side of a lower front surface of the enclosure 102 (FIG. 14), and a photograph seal discharge port 120*l* for discharging a photograph seal sheet 131*o* (FIG. 17) is provided on a side of a lower portion of the enclosure 102.

Figure 17:
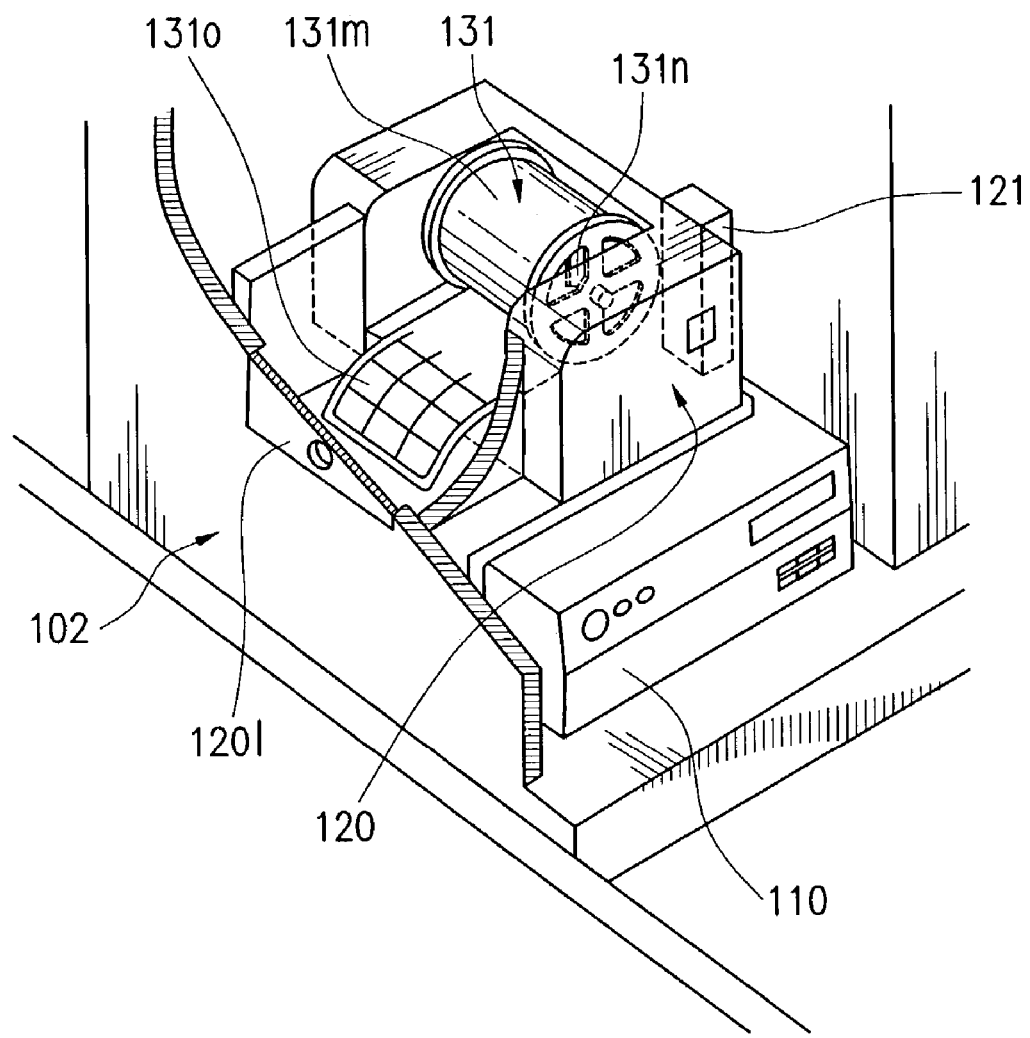
FIG. 17 a partially enlarged view (partially cross sectional view) showing an interior of the enclosure.

Provided inside and below the photograph seal discharge port 120*l* as shown in a partially enlarged view (partially cross sectional view) of FIG. 17 is a control device 110 composed of a personal computer, above which a printer 120 is provided.

A seal paper unit 131 is set on the printer 120 and composed of a roll of seal paper 131*m* and an ID tag 131*n*, in which data such as identification data or the like are stored to identify whether the seal paper is genuine.

Provided behind the printer 120 is an ID tag reader/writer 121 to read the data stored in the ID tag 131*n*.

An explanation will be given below to the photographing space 104 shown in FIG. 13. Provided on a left side on the ceiling surface of the photographing space 104 is a fluorescent lamp illumination device 112*g* to illuminate the photographing space 104 during the photographing process.

A projector 116 for projection of a picture image is provided on a front surface on the ceiling surface of the photographing space 104 to project a preview display prior to photographing and a photographed picture image on the screen 116*p* provided in the enclosure 102 to allow a user to ascertain details of the photographed picture image or the like on a large screen.

In addition, the photographed picture image is displayed (imaged) such that a part (four sheets) among all photographed picture images (eight sheets) is displayed in a manner described later to thereby cause an increase in display size and display resolution as compared with the case where all the picture images are displayed in list, and after confirming details, a user uses the illuminated operation buttons 117 (FIG. 14) to be able to select a photographed picture image being used.

The following is an explanation of the concealed space 105, with reference to FIG. 13. Provided on a top of the concealed space 105 is a curtain rail 217 having a substantially square shape as viewed in plan view and having corners thereof rounded, and suspended from the curtain rail 217 is a loop-shaped specific curtain 218 to enclose the concealed space 105.

The specific curtain 218 is rotatable and moveable along the curtain rail 217 and composed of four surfaces formed by four curtains connected widthwise: an ordinary surface 218*h*; a longitudinal slit surface 218*i*; a transparent, partially patterned surface 218*j*; and a lateral slit surface 218*k*.

The ordinary surface 218*h* is formed by a white, opaque curtain and provided on an upper portion thereof with a plurality of holes 219 aligned in parallel.

The slit surface 218*i* is formed by a white, opaque curtain and provided with a plurality of longitudinal slits in a widthwise direction; and on an upper portion thereof with a plurality of holes 219 aligned in parallel.

The transparent, partially patterned surface 218*j* is formed by a transparent curtain and provided with three star-shaped, white, opaque portions.

The lateral slit surface 218*k* is formed by a white, opaque curtain and provided with a plurality of widthwise slits vertically and on an upper portion thereof with a plurality of holes 219 aligned in parallel.

By rotating the specific curtain 218 formed in this manner, a user can select and use a surface used as a circumferential ground (background and, or foreground).

Methods of using the specific curtain 218 can include: staying in the concealed space 105 to take a photograph while projecting a part of the body such as face, hand or the like from a slit or slits in the slit surface 218*i* or the lateral slit surface 218*k*; staying in the concealed space 105 to take a photograph while covering a part of the body by the star-shaped, white, opaque portion or portions of the transparent, partially patterned surface 218*j*; or staying in the concealed space 105 to take a photograph of a whole body or an upper body with the ordinary surface 218*h*. Thus a user can take a photograph in a novel playful manner, which has not existed. In addition, such photographing makes it possible to apply a chromakey synthesizing, described later, to a portion or portions of the picture image or images having the specific curtain 218, thus increasing the editing effects.

Provided on a ceiling portion of the concealed space 105 is a ceiling illumination box 115*e* having a square shape as viewed in plan view and a triangular shape as viewed in side view.

The ceiling illumination box 115*e* comprises a diffusion plate (not shown) defining a bottom surface of the box and inclined downward that side (back surface side), reflection plates (not shown) defining the remaining surfaces of the box. That is, a ceiling surface, both side surfaces and a front surface, and a strobe illumination device (not shown) disposed in the box and providing illumination obliquely and upward to that side (obliquely and upward toward a back surface side).

Thereby, the ceiling illumination box 115*e* illuminates a subject through the hole or holes 219 or transparent portion or portions of the specific curtain 218 obliquely and downward from the front surface side to be able to photograph details of the subject clearly.

Also, the illumination boxes 115 (15a, 15b, 15c, 15d, 15e) illuminate a subject substantially uniformly at the time of photographing to prevent a shadow on a photographed picture image and to prevent any sense of incongruity when a photographed picture image and a picture image for synthesizing (a picture image for chromakey synthesizing as a circumferential ground of a subject) are synthesized.

Also, the strobe illumination devices 124 (124a, 124b, 124c, 124d, 124e) housed in the respective illumination boxes 115 are individually controlled in luminous intensity by the control device 110 described later to take effect in illumination creating various atmospheres.

In addition, the above projector 116 and the ceiling illumination box 115e are fixed onto a guide (not shown) provided on the ceiling portion of the frame 103.

With the above arrangement, a user can use the digital camera 114 to take a photograph in a state, in which the illumination boxes 115 receive illumination from a light source having a wide area to create atmosphere, and ascertain a photographed picture image displayed on the screen 116p in large size to select a photographed picture image being used, by means of the illuminated operation buttons 117.

Also, the base 118 is used to adjust position and angle of installation of the touch monitor 113f, thus enabling the automatic photograph seal vending apparatus 101 to be installed in conformity to a space in a facility.

Figure 18:
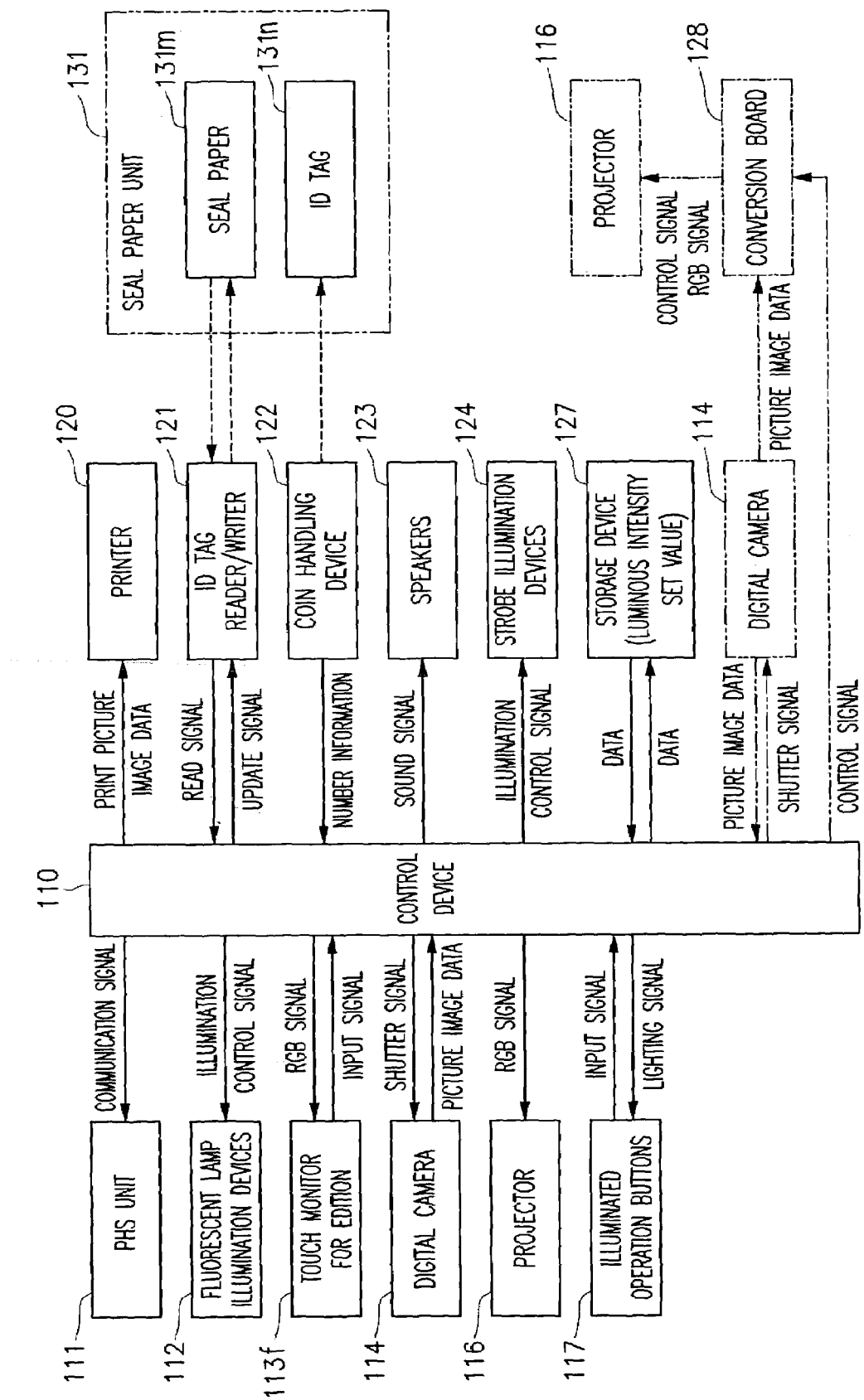
FIG. 18 is a block diagram showing a control circuit of the automatic photograph seal vending apparatus.

Referring to the circuit block diagram shown in FIG. 18., an explanation will be given to the construction of the automatic photograph seal vending apparatus 101.

The automatic photograph seal vending apparatus 101 comprises the control device 110 (control means) provided with a CPU, ROM and a RAM to perform control operations of various devices, and respective devices described later and connected to the control device 110.

The control device 110 controls the strobe illumination devices 124 (124a, 124b, 124c, 124d, 124e) in the respective illumination boxes 115 to cause the same to perform illumination in luminous intensity conformed to a photographing mode described later. Also, at the time of preview the control device also controls the fluorescent lamp illumination devices 112 to cause the same to perform illumination in luminous intensity conformed to the photographing mode.

The control device also implements a process for chromakey synthesizing a picture image for synthesizing as a circumferential ground of a subject, into a white portion or portions of a photographed picture image to create synthesized picture image data. Chromakey synthesizing means a process for replacing that portion or portions of a photographed picture image being photographed, which have a brightness (lightness) of at least a predetermined level, by a picture image for synthesizing. Thereby making it easy to perform replace only that white portion or portions (circumferential ground) that are formed by the specific curtain 218, or the like, with a picture image for synthesizing, which may be an image of a costume, clouds, or the like.

A PHS unit 111 enables radio communications via Internet (public line) and transmits an edited picture image and/or a photographed picture image to a mail server (not shown) and a WWW server (not shown) provided on Internet in accordance with a communication signal of the control device 110.

In addition, through transmission to the mail server, a user can receive an electronic mail as a file with data of an edited picture image and/or a photographed picture image to make secondary use of the same.

Also, the WWW server automatically shows an edited picture image as received on a home page, a user accesses the home page of the WWW server by way of a portable telephone or a personal computer to read and download his edited picture image and/or photographed picture image, and even a user having no mail-address can acquire data of the edited picture image and/or photographed picture image.

The fluorescent lamp illumination device 112 carries out continuous illumination from the start of play to the start of editing in accordance with an illumination control signal from the control device 110, during which the device illuminates the photographing space 104 brightly.

Also, the fluorescent lamp illumination device 112 is composed of fluorescent lamps of a type, which can be adjusted in luminous intensity (control in luminous intensity), and luminous intensity in the photographing process is controlled by the control device 110 so as to assume a luminous intensity set value described later, so that an effect of illumination conformed to a photographing mode can be ascertained even in a preview display of photographing.

The touch monitor 113f for editing receives a RGB signal from the control device 110 to display a picture image such as a picture image for editing of scribble according to the signal. Also, coordinates touched by a user are transmitted as an input signal to the control device 110. Thereby, a user is allowed to perform editing of scribble on a photographed picture image.

The digital camera 114 takes a photograph upon receipt of a shutter signal from the control device 110 and transmits picture image data, such as photographed motion picture data during the posturing prior to photographing and photographed still picture data as photographed, to the control device 110. Also, modification of the zoom multiplying factor makes it possible to take a photograph switching between whole body photographing and close-up photographing.

The projector 116 operates in accordance with a control signal from the control device 110 and projects a motion picture image or a still picture image onto the screen 116p (FIG. 13) in accordance with a RGB signal to allow a user to ascertain his posture before photographing.

In addition, when synthesized motion picture data, in which a motion picture for preview and a picture image for synthesizing are synthesized in real time, is received from the control device 110, the projector projects a motion picture or a still picture of the synthesized picture image enabling a user to determine a posture while ascertaining an image after synthesizing and to ascertain a synthesized picture image resulting from photographing.

The illuminated operation buttons 117 puts on/of flights in accordance with a lighting signal from the control device 110 and transmits an input signal representative of a button depressed by a user to the control device 110. Thereby, a user is allowed an operation, such as switching between whole body photographing and close-up photographing, start of countdown of a shutter, and selection of a picture image being edited from among photographed pictures imaged.

The printer 120 receives print picture image data from the control device 110 to print the received print picture image on the seal paper 131m of the seal paper unit 131 (FIG. 17), thus discharging a photograph seal sheet 131o created.

The ID tag reader/writer 121 reads data stored in the ID tag 131n provided in the seal paper unit 131 by way of a read signal, and updates the data by way of an update signal. Thereby, the update process for determining whether the seal paper unit 131 is genuine, overwriting the number of count (the times of printing) at need, and so on is implemented.

A coin handling device 122 is provided inside the coin slot 122q to determine the genuineness and kind of a coin or coins deposited and to transmit the number of coins deposited as a number information to the control device 110. In addition, depositing of coins constitutes a signal starting play (sale process).

In accordance with a sound signal from the control device 110, the speakers 123 announce countdown at the time of photographing and movement for editing to a user.

The strobe illumination devices 124 (124a, 124b, 124c, 124d) are composed of strobe illumination devices of a type enabling adjustment of luminous intensity (control of luminous intensity), and performs strobe emission in luminous intensity of a luminous intensity set value (described later) in accordance with an illumination control signal from the control device 110 at the time of photographing.

A storage device 127 stores the settings of the number of coins required for play on the automatic photograph seal vending apparatus 101, the period of time for play and the like, and luminous intensity set values (described later). Also, the storage device stores a picture image for chromakey synthesizing of a subject into a circumferential ground, as data to carry out reading/writing of the data under the control of the control device 110. The picture images for synthesizing, such as a figure wearing Japanese clothes whose face and hands are excluded, a cloud floating in the sky, raging waves or the like, are stored.

With the above arrangement, a user can acquire a photographed picture image, in which an atmosphere is presented by illumination, and perform editing such as chromakey synthesizing.

Figure 20:
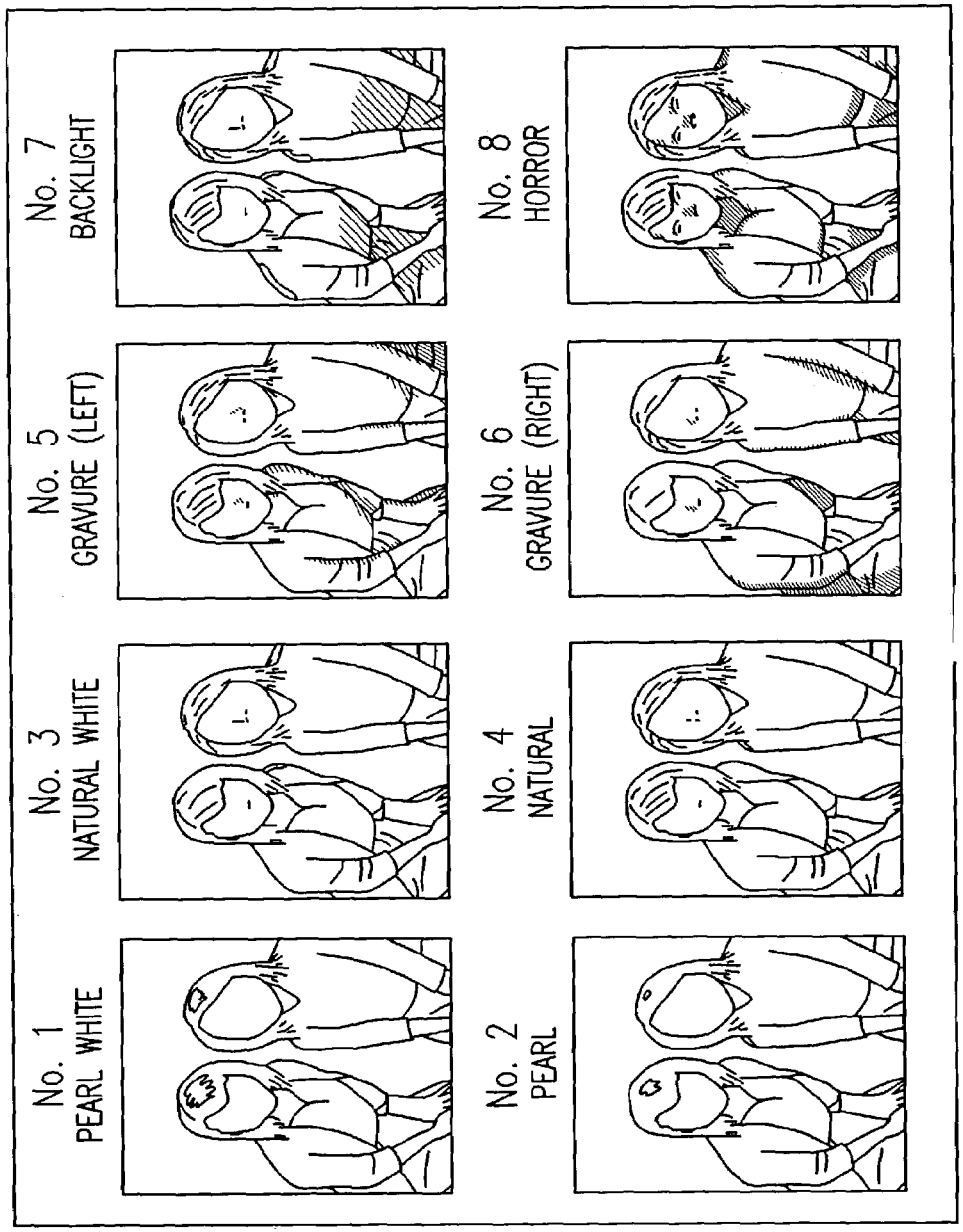
FIG. 20 is an illustration showing illuminating effects in the automatic photograph seal vending apparatus.

Subsequently, an explanation will be given to the luminous intensity set values stored in the storage device 127 with reference to a luminous intensity set value illustration showing a list of luminous intensity set values in FIG. 19 and an illustration of illuminating effect shown in FIG. 20.

In the automatic photograph seal vending apparatus 101 according to the embodiment, there are eight set photographing modes as shown in FIG. 19, that is, photographing modes being different in brightness from No. 1 "pearl white" to No. 4 "natural", and photographing modes presenting specific atmospheres from No. 5 "gravure (left)" to No. 8 "horror".

For example, No. 1 "pearl white" will be explained. The respective strobe illumination devices 124 are set in luminous intensity in the following manner: strobe illumination device 124e (housed in the ceiling illumination box 115e): ON; strobe illumination device 124a (housed in the upper illumination box 115a): ON; strobe illumination device 124b (housed in the left illumination box 115b): ON; strobe illumination device 124c (housed in the right illumination box 115c): ON; strobe illumination device 124d (housed in the lower illumination box 115d): OFF; such that by photographing mainly a subject's face white as shown in No. 1, "pearl white" in FIG. 20, a pretty photographed picture image in pearl tone worth of an automatic photograph seal vending apparatus unlike skin color in an illuminated photograph is obtained.

In addition, "pearl white" is set so that a generally bright photographed picture image in pearl tone is obtained by adjusting setting of luminous intensity of every strobe illumination device 124 in a manner to have several ones of the respective strobe illumination devices 124 causing illumination in strong luminous intensity.

Likewise, setting is made to acquire photographed picture images, in which the following atmospheres are presented:
No. 2 "pearl", in which brightness is weaker than in No. 1;
No. 3 "natural white", in which a face in skin color as in an illuminated photograph is somewhat bright;
No. 4 "natural", in which brightness is weaker than in No. 3;
No. 5 "gravure (left)", in tone of a gravure photograph in illumination from left;
No. 6 "gravure (right)", in tone of a gravure photograph in illumination from right;
No. 7 "backlight", in which the surroundings around a subject is bright; and
No. 8 "horror", in a horror tone illuminated from under.

In addition, depending upon the respective photographing modes, the control device 110 modifies sound such as countdown informing of shutter timing (for example, sound in horror tone in the case of No. 8 "horror") to create an atmosphere conformed to an associated photographing mode.

Also, photographing courses, in which the respective photographing modes are combined, are set in the following manner:

"recommended course": photographing of two sheets is carried out every one of four modes including pearl white, natural white, gravure (left) and horror modes;

"pretty course": photographing of two sheets is carried out even one of four modes including pearl white, pearl, natural white, and natural modes;

"interesting course": photographing of two sheets is carried out every one of four modes including pearl white, gravure (left), backlight and horror modes; and "favorite course": a user optionally selects four among eight photographing modes, and photographing of two sheets is carrier out in the selected photographing modes.

In this manner, illumination presenting means (for example, means for presenting an atmosphere through illumination like the control device 110 for adjusting and controlling luminous intensity in the present embodiment) for presenting an atmosphere through illumination affords acquiring a photographed picture image of ample variety to increase the quality of amusement for photographing, thus improving the degree of a user's satisfaction.

In addition, the illumination means for adjustment may be the strobe illumination devices 124 and/or the fluorescent lamp illumination device 112, or may be set to adjust tone of illumination light as well as adjustment of luminous intensity.

Here, the fluorescent lamp illumination device 112 is provided in the vicinity of the strobe illumination devices 124, and made ON/OFF at the time of preview in accordance with the photographing illumination balance of the strobe illumination devices 124 corresponding to a selected photographing mode, that is, the above luminous intensity set value, and the respective luminous intensities are adjusted to modify the illumination balance. Thereby, it is possible to ascertain an illumination effect obtained in photographing at the time of preview and to beforehand ascertain an atmosphere of a finished image to enable photographing in a posture conformed to the atmosphere.

In order to make use of such effect more appropriately, it is also better to provide the fluorescent lamp illumination devices 112 close to the respective front sides (this side) of the strobe illumination devices 124a, 124d in addition to the fluorescent lamp illumination devices 112b, 112c shown in FIG. 14. Thereby, an atmosphere presented by illumination every photographing mode can be completely reproduced by continuous illumination at the time of preview.

Figure 21:
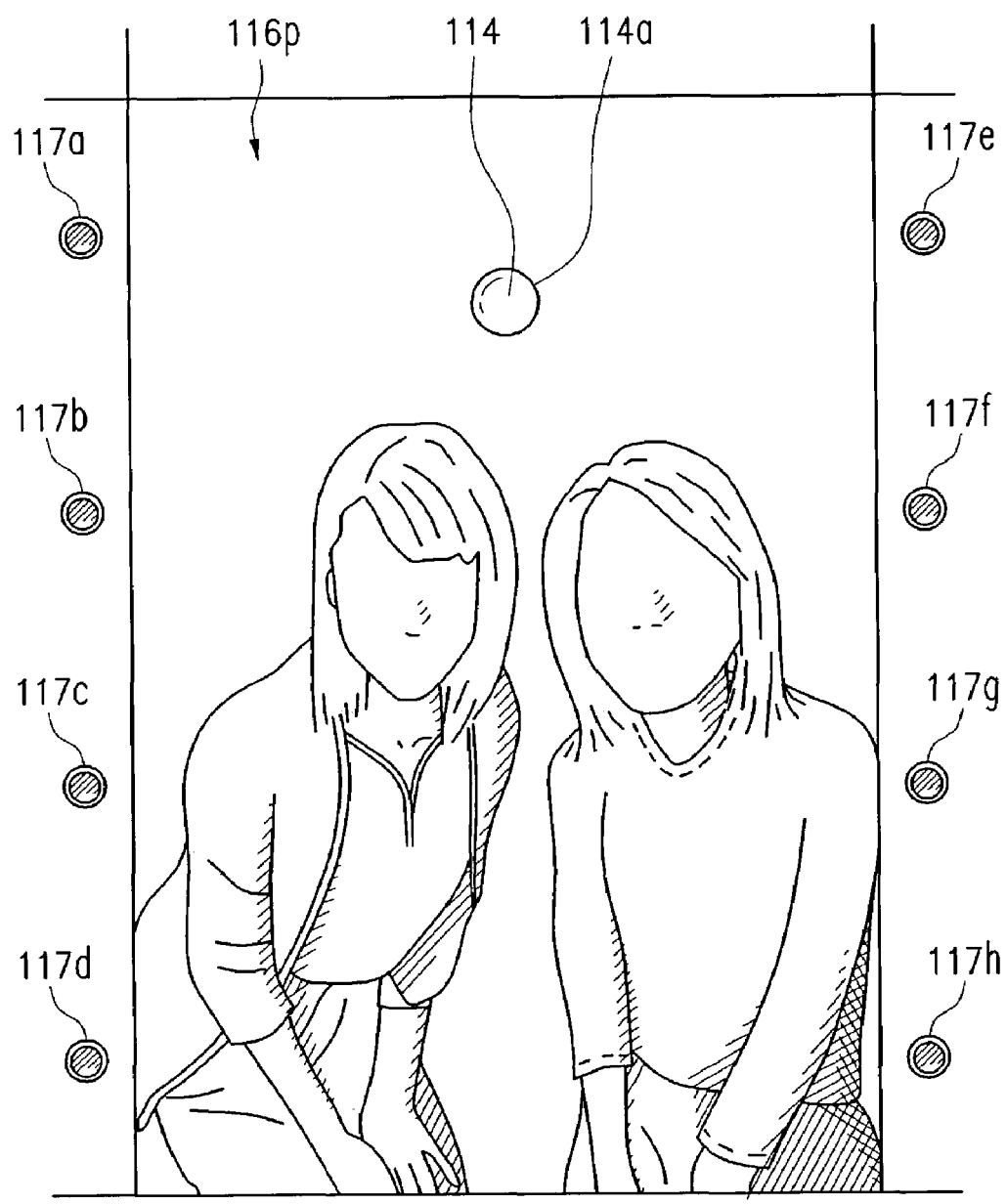
FIG. 21 is an image view showing a preview screen in the automatic photograph seal vending apparatus.

With such constitution and setting in this manner, continuous illumination devices (the fluorescent lamp illumination devices 112) present an atmosphere at the time of preview, which requires long term illumination, so that a user can ascertain details of the illumination effect in a large screen. For example, in the case where a photographing mode is "gravure (left)", a picture image of a subject given the presentation of an atmosphere by the continuous illumination devices as shown in FIG. 21 is displayed (motion picture display) in a substantially life-sized preview. Such displaying in a large screen enables a user to ascertain details of an atmosphere in an associated photographing mode before photographing.

Also, at the time of photographing, in which a sufficient luminous intensity is necessary, the instantaneous illumination devices (the strobe illumination devices 124) present an atmosphere adequately and effectively whereby a user can acquire a photographed picture image conspicuously reflecting the illumination effect in an associated photographing mode.

In addition, incandescent lamp illumination devices may be used, as the continuous illumination devices, together with or in place of a fluorescent lamp illumination devices.

The continuous illumination devices may be illuminated at the time of photographing in addition to the time of preview.

Also, the continuous illumination devices (the fluorescent lamp illumination devices 112) may not be adjusted in luminous intensity but only switching between ON/OFF may be configured to enable ascertaining an illumination effect. Also, all the continuous illumination devices (the fluorescent lamp illumination devices 112) may be made ON and individually changed in luminous intensity to enable ascertaining an illumination effect.

Due to the above settings, a user can easily perform a varied photographing, having been given the presentation of an atmosphere at the time of photographing, without any complex operation or the like. Therefore, a user performs not only photographing but also can enjoy illumination effects such as gravure, horror tones and the like and ascertain and determine a posture conformed to the illumination effects in preview display. Thereby, the quality of amusement for photographing is greatly improved and the degree of a customer's satisfaction for a finished photograph seal sheet 131o (FIG. 17) is increased.

Below is an explanation of an operation of the automatic photograph seal vending apparatus 101 with reference to a process flowchart of an operation of the control device 110 shown in FIGS. 22 and 23, and image views of a photographed picture image selection screen shown in FIG. 24.

First, the control device 110 starts up a software stored in the storage device 127 to implement initialization of various devices (STEP p1) to project a projected image in a demonstration screen onto the screen 116p and wait until coins are deposited into the coin slot 122q (STEP p2).

When a user deposits coins, he is first caused to select a photographing course (STEP p3).

In the case where the selected photographing course is not automatic, that is, the "favorite course" is selected (STEP p4), a user is invited to select a photographing mode (STEP p5), and in the case where a photographing course other than the "favorite course, is selected (not automatic), the STEP p5 is skipped.

Until charging of the strobe illumination devices 124 is terminated, the control device 110 projects (motion picture display) a picture image of a subject onto the screen 116p and waits in a state of preview display (STEP p6). When the charging is completed, countdown is made in sound conformed to a photographing mode and charging of the strobe illumination devices 124 is effected in luminous intensity conformed to the photographing mode, illumination light of the strobe illumination devices being used for photographing of a subject with the digital camera 114 (STEP p7).

In addition, at the time of preview displaying, the respective fluorescent lamp illumination devices 112 are put on in brightness according to a luminous intensity set value (FIG. 19) for the photographing mode. Thereby, an image of results of a photographed picture image, such as atmosphere, state of face taken, state of shadow, or the like is made understandable.

Also, the illuminated operation buttons 117 are put on in a descending order according to countdown by sound. Thereby, a shutter timing can be visibly and audibly transmitted so that the information will still be received by a user who is hearing impaired Judging whether photographing has been made two times in the same photographing mode, the control device 110 returns to STEP p6 where photographing has not been made two times (made once), proceeds to STEP p9 where photographing has been made two times (STEP P8).

When the number of settings for photographing is four or less (that is, before photographing is made two times in one photographing mode and eight photographed picture images in total have been acquired), the control device returns to STEP p4 and in the case where photographing has been made four times, the process proceeds to the next STEP p10 (STEP p10).

When the photographing setting has been made four times, the process proceeds to STEP p12 if a previous user has terminated editing of scribble in the editing space 106, and if the photographing process is implemented again where such editing of scribble has not been terminated (STEP p10). In this photographing process, a user is invited to select a photographing mode and to select which of photographed picture images that were already been photographed in a previous STEP should replace the photographed picture image.

The control device 110 implements a kept picture image selecting process (described later) of inviting a user to select four kept picture images for use, among eight photographed picture images having been photographed in the above manner (STEP p12).

The control device 110 urges a user to move by sound with the speakers 123 and by projection of a picture image onto the screen 116p to the editing space 106 for editing of scribble (STEP P13).

The control device 110 implements an editing process allowing a user to edit scribble (STEP p14). The editing process permits scribble such as scribble in free hand with a pen, scribble for arrangement of background patterns and designs beforehand prepared, the above chromakey synthesizing, or the like, and enables a user to create various edited picture images.

When the editing process is terminated, a user is invited to select a division pattern (pattern of arrangement of edited picture images) such as equal eight section, two large sizes plus four small sized, or the like (STEP p15).

The control device 110 displays a mail-address input guiding screen on the touch monitor 113f for editing and informs a user that an edited picture image can be transmitted to a mail-address as input, allowing input of a mail-address (STEP P16). In addition, where a mail-address is input, the control device transmits a mail with edited picture image data to the mail-address through the PHS unit 111.

The control device 110 displays and guides discharge of a photograph seal sheet 131o from a point on the enclosure 102 lateral to the touch monitor 113f (STEP p17), discharging from the photograph seal discharge port 120l the photograph seal sheet 131o formed by causing the printer 120 to print the edited picture image on a seal paper 131m (STEP p18).

The kept picture image selecting process (STEP p12) is further described with reference to FIG. 23.

Figure 24:
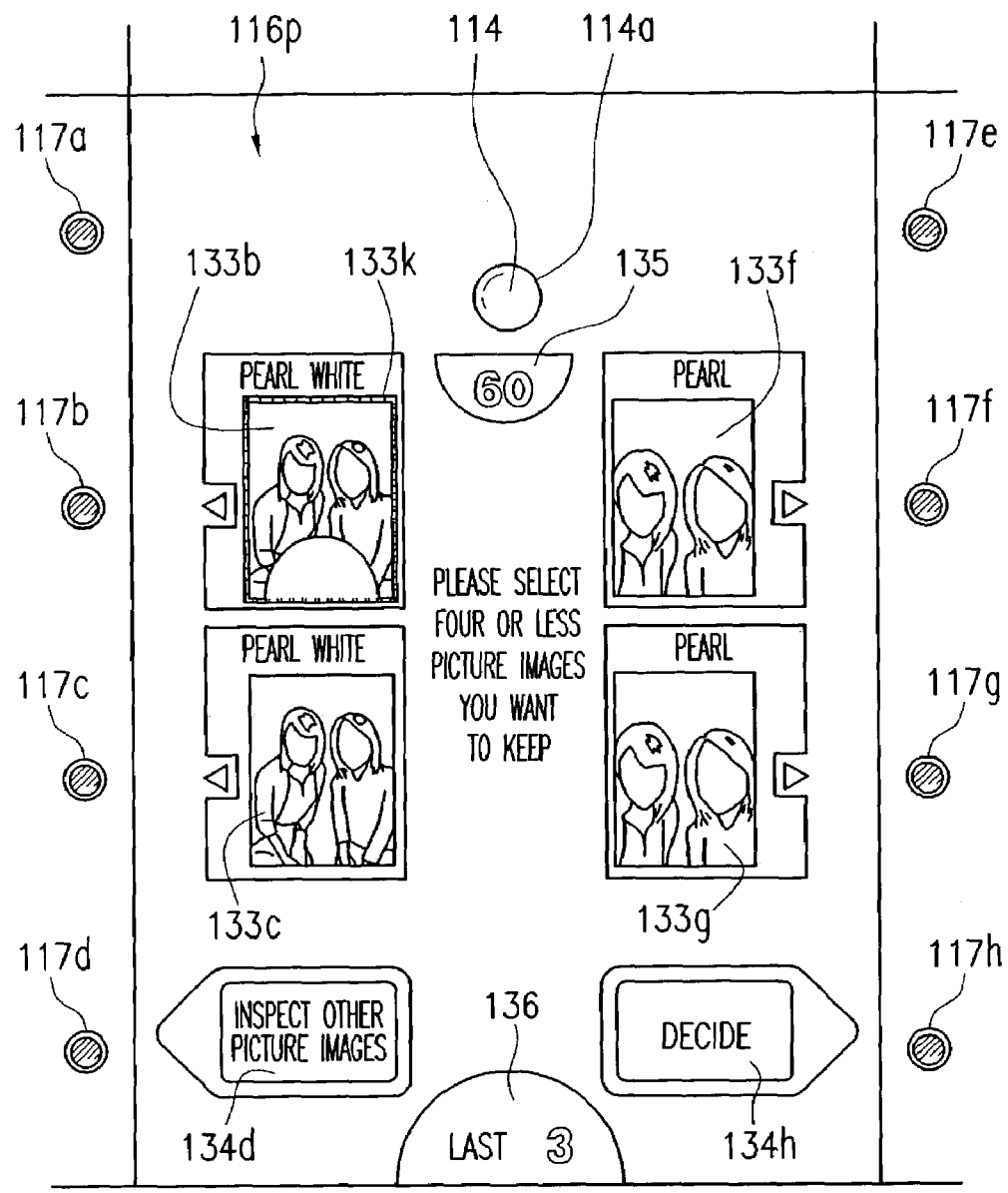
FIG. 24 is an image view showing a photographed picture image selection screen in the automatic photograph seal vending apparatus.

The control device 110 displays four photographed picture images initially photographed, among eight photographed picture images on the screen 116p as shown in FIG. 24, and invites a user to select a picture image or images for editing of scribble with the illuminated operation buttons 117 (117a, 117b) (STEP q1). In addition, photographed picture images being displayed at a time are reduced to four whereby the photographed picture images are displayed in high resolution and large size to allow a user selection while ascertaining details of the photographed expression and shadow from the photographing mode.

Here, when the illuminated operation button 117b is depressed by a user, a photographed picture image 133b corresponding to the illuminated operation button 117b as shown in FIG. 24 is surrounded by a selection frame 133k and displayed for demonstration of selection.

When time-out comes, the process proceeds to STEP q9 (STEP q2), and when running in time, it is ascertained whether the illuminated operation button 117d corresponding to a button 134d for inspection of other picture images is depressed (STEP q3) and whether the illuminated operation button 117h corresponding to a decision button 134h is depressed (STEP q4).

If the illuminated operation button 117d (corresponding to the button 134d for inspection of other picture images) is not depressed, the process returns to STEP q2. If the illuminated operation button 117h (corresponding to the decision button 134h is depressed) is depressed, the process proceeds to STEP q9.

As in STEP q2 to STEP q4 above, the control device 110 controls whether time-out comes, whether next picture images should be selected (STEP q7), and whether selection is terminated (STEP q8), and projects four picture images finally selected onto the screen 116p (STEP q9).

Until a user depresses selection OK, the process returns to STEP q1 to repeat the kept picture image selecting process. When a user is satisfied by the photographed picture images and depresses selection OK, the kept picture image selecting process is terminated (STEP q10). Thereby, when a errs in final affirmation, such termination can be cancelled once and selection can be made again.

In addition, a remaining time (for example, 60 seconds) is displayed on a countdown display section 135 in an upper, central portion of the screen 116p as shown in FIG. 24, and a display section 136 is displayed in a lower, central portion of the screen 116p. Thereby, a user can easily determine the state of the procedure.

Also, when a limited time has elapsed before a user completes selection of four photographed picture images, it is set such that a first sheet in the respective photographing modes is used.

Figure 25:
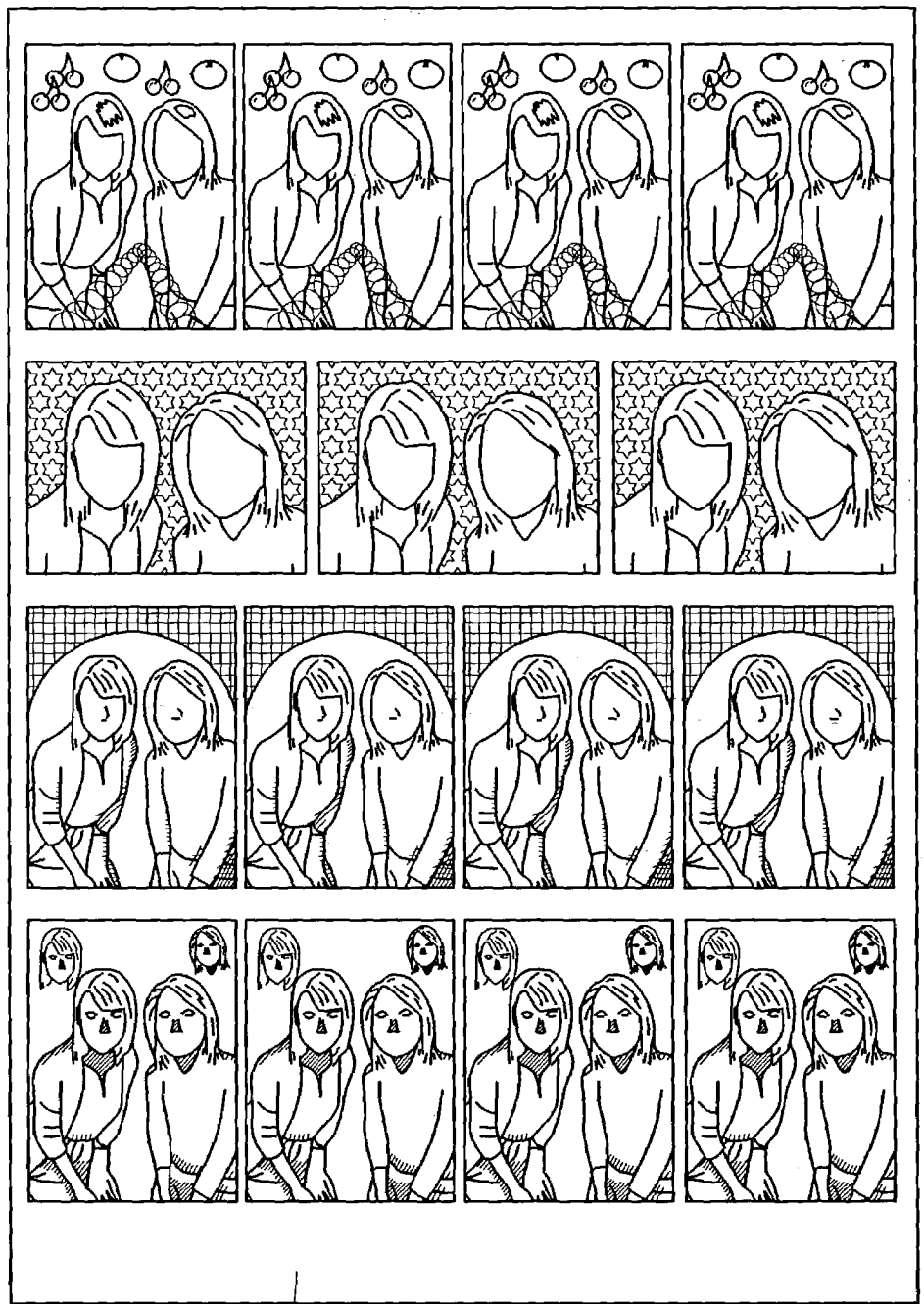
FIG. 25 is an image view showing a photograph seal sheet in the automatic photograph seal vending apparatus.

The above operations enable a user to acquire photographed picture images given various illumination effects, and a photograph seal sheet 131o presenting a playful feeling as shown in an image view of FIG. 25 can be obtained.

In addition, according to the fourth embodiment, all eight photographed picture images may be projected onto the screen 116p to be displayed in STEP q1 described with reference to FIG. 23 and photographed picture images selected by the illuminated operation buttons 117 (117a to 117h) may be displayed in enlarged scale.

Figure 26:
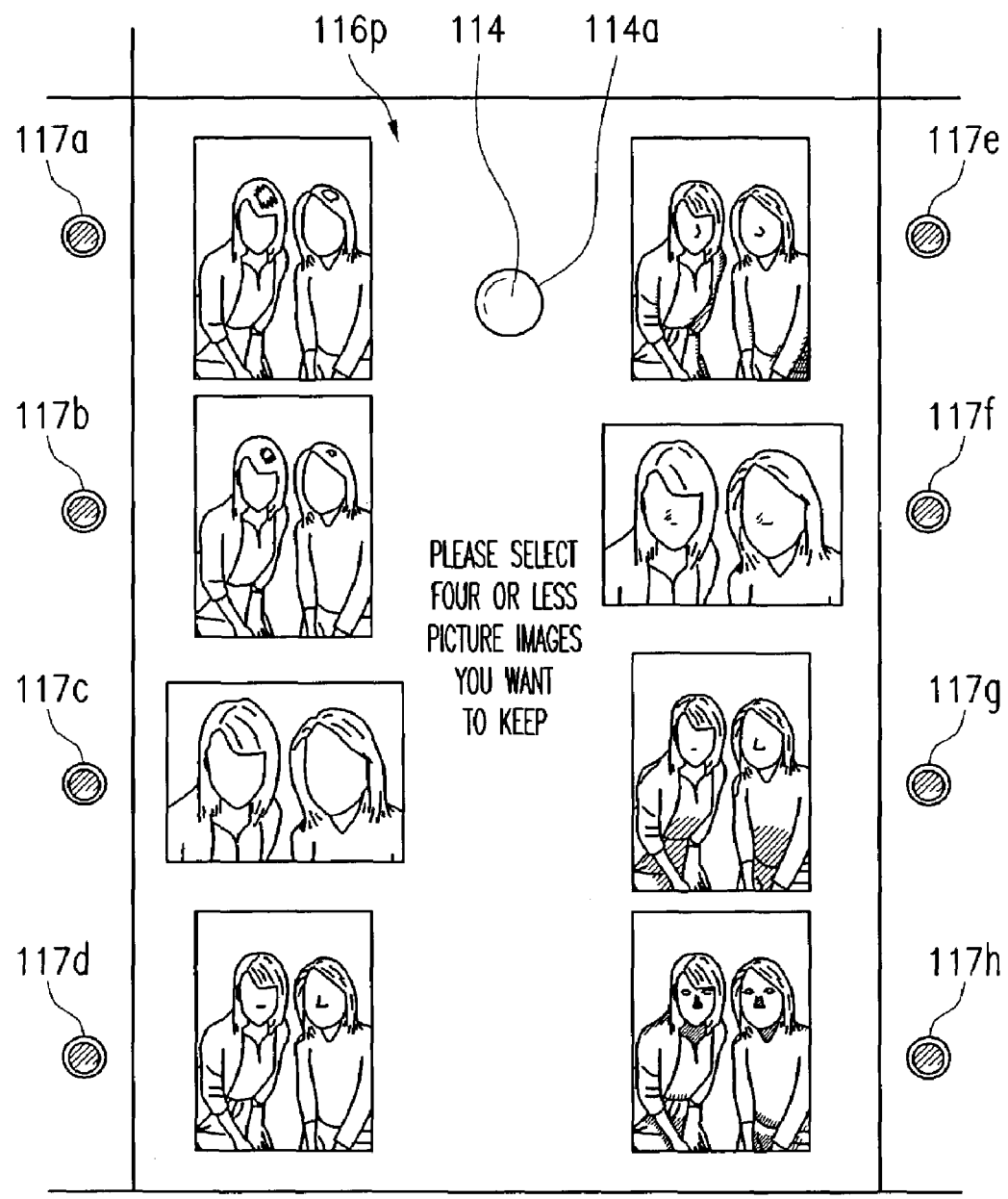
FIG. 26 is an image view showing a photographed picture image selection screen in the automatic photograph seal vending apparatus.
Figure 27:
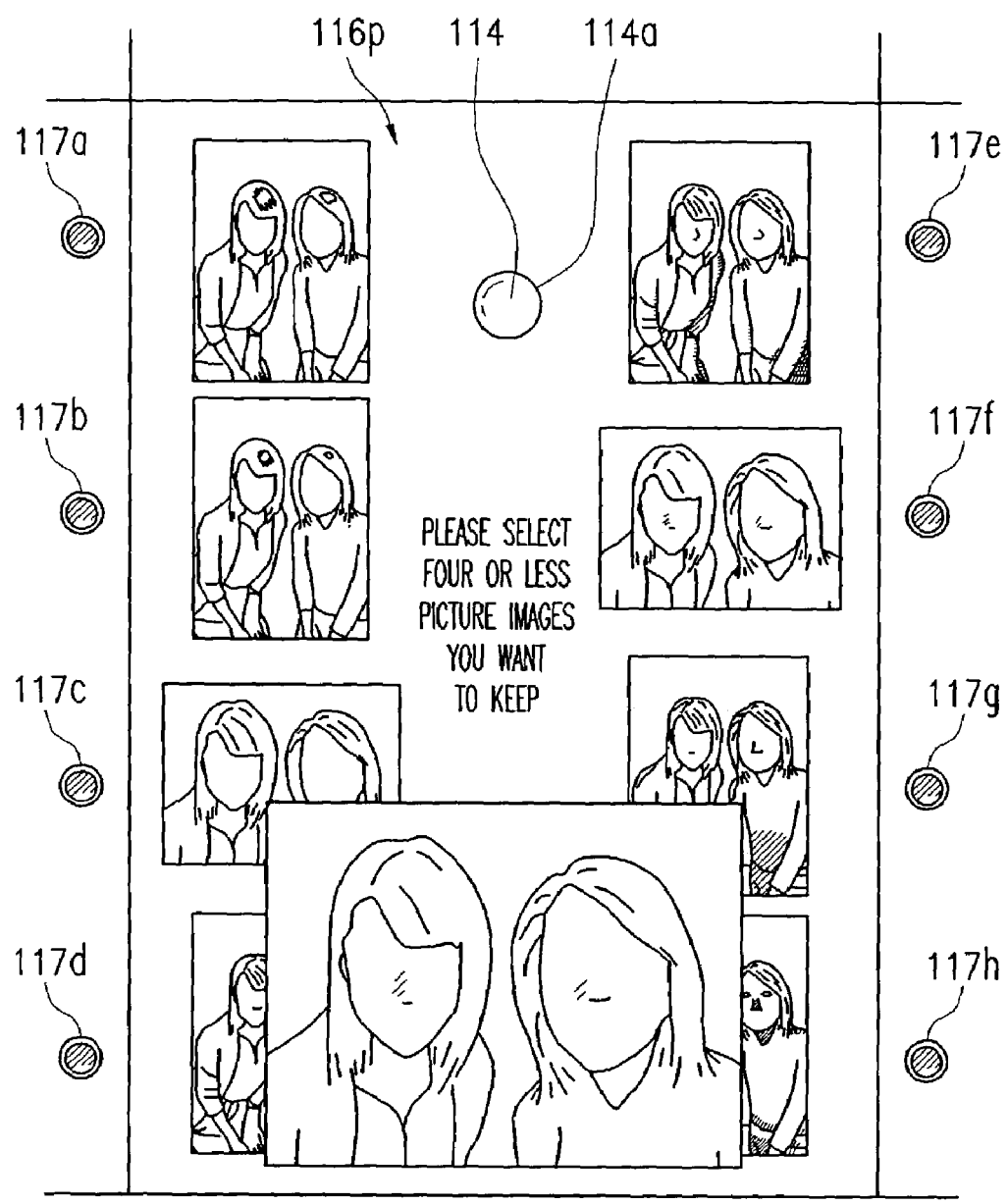
FIG. 27 is an image view showing a photograph seal sheet in the automatic photograph seal vending apparatus.

More specifically, as shown in an image view of a photographed picture image selection screen shown in FIG. 26, photographed picture images corresponding to the illuminated operation buttons 117 are displayed in a list, and when a user depresses an optional one of the illuminated operation buttons 117 (for example, the illuminated operation button 117f), a corresponding photographed picture image is displayed in a lower area in enlarged scale as shown in an image view of a photographed picture image selection screen shown in FIG. 27.

If the same illuminated operation button 117 (that is, the illuminated operation button 117f) is depressed again, a photographed picture image displayed in enlarged scale is selected as a picture image for editing, and in the case where another button (that is, the illuminated operation button 117a) is depressed, a photographed picture image corresponding to the illuminated operation button 117 (that is, the illuminated operation button 117a) is displayed in enlarged scale.

When selection is to be cancelled, an illuminated operation button 117 corresponding to a photographed picture image as selected is depressed two times whereby a state of non-selection is brought about.

In the above setting, photographed picture images as selected can be displayed in high resolution and large size, as compared with eight photographed picture images displayed four by four, so that further details can be ascertained.

Also, four photographed picture images for use, selected by a user may be photographed two by two in the respective photographing modes and one of the respective two photographed picture images may be selected so that four photographing modes associated with photographing are included. For example, two in "pearl white" are selected, one in "natural white" is selected, and one in "gravure (left)" are used and photographing in "horror" is made but not used.

Also, luminous intensity set values described with reference to FIG. 19 may include ones in photographing modes of other patterns or may be reduced by reduction in the number of photographing modes, and the strobe illumination device or devices 124 having an indication of 0 may be set to effect feeble illumination.

Also, the photograph seal sheet 131o may display photographing modes in letters so as to reveal a photographing mode used in photographing such that the letters are printed in the vicinity of an edited picture image (or a photographed picture image having not yet been edited) and are displayed in abbreviation. Thereby, a user can recognize which photographing modes correspond to respective picture images, providing guidance for subsequent use.

Figure 22:
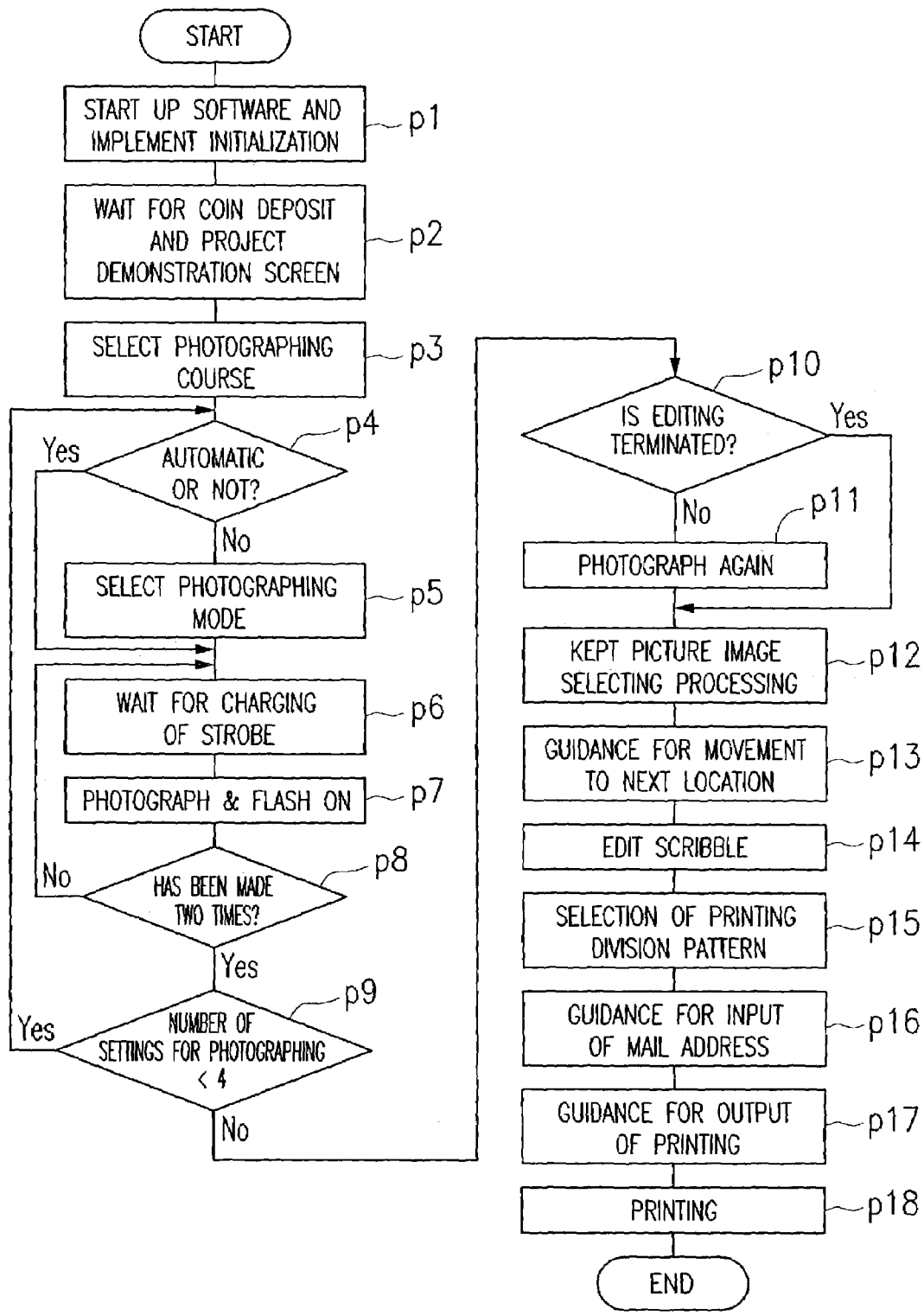
FIG. 22 is a flowchart showing an operation of a control device in the automatic photograph seal vending apparatus.
Figure 23:
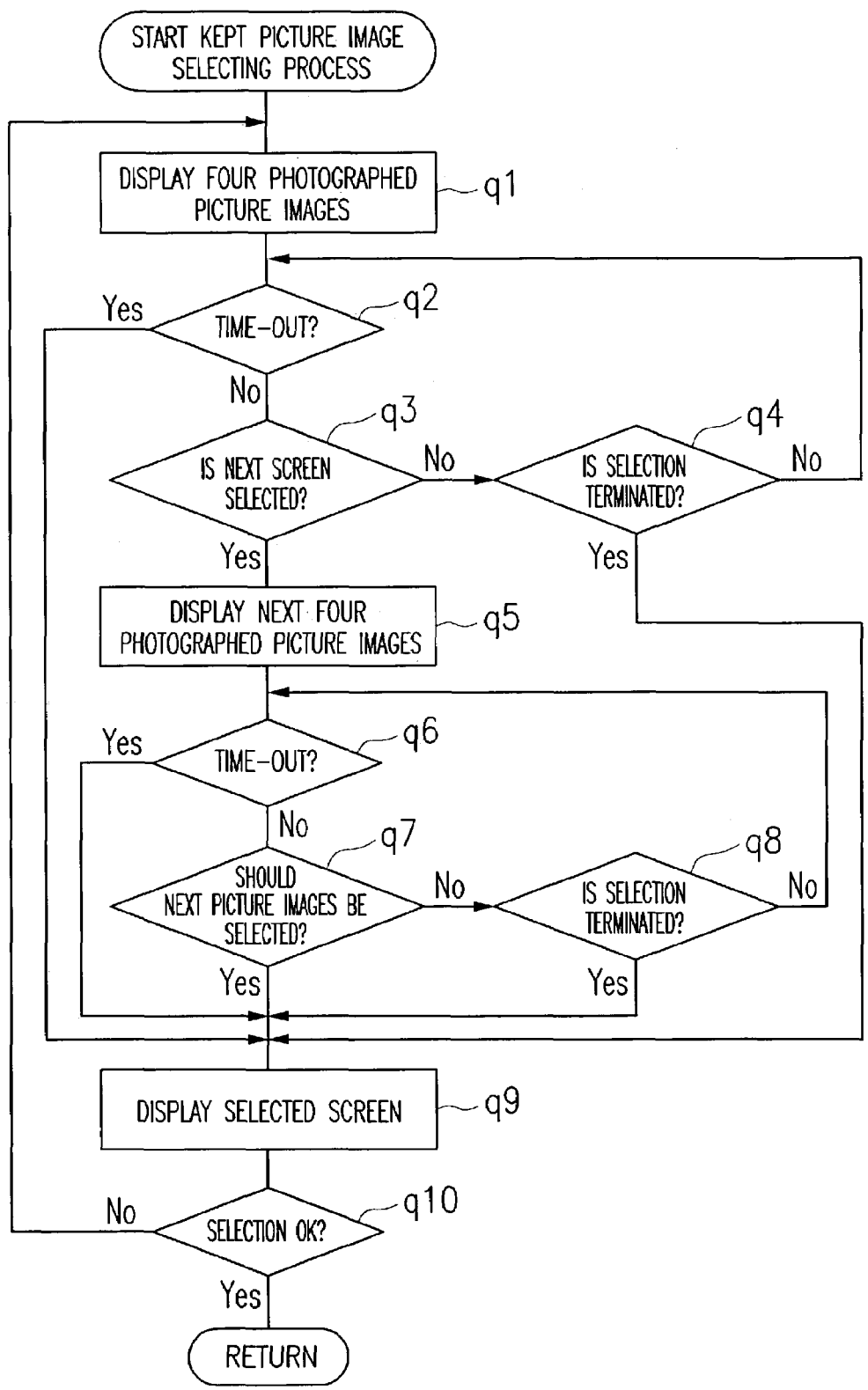
FIG. 23 is a flowchart showing an operation of the control device in a kept picture image selecting process.

Also, the printing process in STEP p18 shown in FIG. 22 may be started after the printing division pattern in STEP p15 is selected and guidance for the input of a mail-address in STEP p16 may be made during the printing.

Also, the illuminated operation buttons 117 may be composed of operation means, such as touch sensor, which transmits a signal when touched by a user.

Also, the illumination means having its state of illumination such as luminous intensity, luminescent color, or the like, controlled by the control device 110 can be composed of strobe illumination devices, fluorescent lamp illumination devices, incandescent lamp illumination devices, or a combination thereof, and it is possible to use illumination means of achromatic color (white) or chromatic color.

Also, the illumination means may be composed of color modification means such as color film or the like to afford modification of color matching.

Also, circuits for the digital camera 114 and the projector 116 may be configured such that the digital camera 114 is connected to the control device 110 and the projector 116 is connected to the digital camera 114 via the conversion board 128.

In this case, the digital camera 114 transmits picture image data to the control device 110 as well as to the conversion board 128. In accordance with a control signal from the control device 110, the conversion board 128 implements necessary conversion processes such as left-right reversal, vertical and horizontal conversion for the picture image data to transmit the same to the projector 116 as a RGB signal.

With such construction, it is possible to reduce load on the control device 110.

Also, the projector 116 and the screen 116$p$ may be composed of display means such as touch monitor, display or the like.

Also, the specific curtain 218 may be composed of other colors than white, such as blue, green or the like suited to chromakey synthesizing, or various colors and patterns every surface thereof irrespective of chromakey synthesizing. Thereby, photographed picture images can be widely varied by means of presentation in illumination and background through photographing in a photographing mode of horror setting with the specific curtain 218 of, for example, red color as a background for acquisition of a reddish photographed picture image like horror.

Also, the specific curtain 218 may be formed from a single-sheet curtain between the photographing space 104 and the concealed space 105, and the specific curtain 218 may be formed from a single-sheet curtain to be provided on the front side of the photographing space 104 while, for example, a passage or the like may be used in place of the concealed space 105 without providing the concealed space 105 on the front side thereof.

A part or a whole of the constitution, construction, function and operations described only in one of the above embodiments may be applied to any other of the embodiments. Thereby, the automatic photograph seal vending apparatus 1, 101 can be completed in variations and provided to better reflect demands of facilities and users.

The automatic photograph seal vending apparatus according to the invention corresponds to the automatic photograph seal vending apparatus 1, 101 according to the embodiments, and likewise the seal paper unit corresponds to the seal paper unit 8 and the seal paper unit 131; an identifier corresponds to the ID tag 8$a$ and the ID tag 131$n$; the seal paper corresponds to the seal paper 8$b$ and the seal paper 131$m$; the photograph seal sheet corresponds to the photograph seal sheet 8$c$ and the photograph seal sheet 131$o$; the photographing means corresponds to the digital camera 11 and the digital camera 114; the image taking point corresponds to the camera hole 11$a$ and the camera hole 114$a$; the illumination means corresponds to the strobe illumination devices 13 and the strobe illumination devices 124; the identification means corresponds to the ID tag reader/writer 19 and the ID tag reader/writer 121; the output means corresponds to the printer 20 and the printer 120; the picture image projection means corresponds to the projector 31 and the projector 116; the large-sized display means corresponds to the projector 31 and the white plates 41, and the projector 116 and the screen 116$p$; the imaging member corresponds to the white plates 41 and the screen 116$p$; and the displayed picture image selection means corresponds to the control device 110. The invention is not limited to the constitution of the above embodiments but provides many embodiments.

What is claimed is:

1. An automatic photograph seal vending method comprising:

providing a photographing process means for creating a photographed picture image or images, wherein an illumination means illuminates one or more subjects in a photographing space and a photographing means takes a photograph, permitting an editing process for creating an edited picture image or images, wherein an editing means edits a picture image or images as an object of editing, using an output means to output a predetermined picture image or images, and using a large-sized display means capable of fully displaying the one or more subjects substantially in life size to display the predetermined picture image or images during the editing process, the large sized display means having a front side that is oriented to be viewed by a user and a rear side, the predetermined picture image or images being displayed by projection onto the front side.

2. The automatic photograph seal vending method according to claim 1, wherein the display means comprises picture image projecting means for projecting a picture image and an imaging member for imaging the projected picture image.

3. The automatic photograph seal vending method according to claim 2, wherein an image taking point of the photographing means is arranged in an imaging range of the imaging member to make photographing.

4. The automatic photograph seal vending method according to claim 1, 2, or 3, further comprising providing a display picture image selection means for selectively displaying a predetermined number of photographed picture images in large size on the large-sized display means when a plurality of photographed picture images are obtained by photographing of a plurality of times.

5. An automatic photograph seal vending method comprising:

providing a photographing process means for creating a photographed picture image or images, wherein an illumination means illuminates one or more subjects in a photographing space and a photographing means takes a photograph, enabling an editing process for creating an edited picture image or images, wherein an editing means edits a picture image or images as an object of editing, using an output means to output a predetermined picture image or images, and using a large-sized display means capable of displaying the one or more subjects substantially in life size to display the predetermined picture image or images to facilitate the photographing process and/or the editing process; and providing a seal paper unit, the seal paper unit including seal paper, on which a picture image or images are printed, and an identifier permitting identification of genuineness of the seal paper; and providing an identification means for identifying the identifier to permit printing of the predetermined picture image or images.

6. An automatic photograph seal vending apparatus comprising
   a photographing process means for creating a photographed picture image or images, wherein an illumination means illuminates one or more subjects in a photographing space and a photographing means takes a photograph,
   an editing process means for creating an edited picture image or images, wherein an editing means edits a picture image or images as an object of editing,
   an output means for outputting a predetermined picture image or images, and
   a large-sized display means capable of fully displaying the one or more subjects substantially in life size for displaying a predetermined picture image or images in the photographing process and/or the editing process, the large-sized display means comprising a picture image projecting means for projecting a picture image configured to project an image toward the photographing means.

7. The automatic photograph seal vending apparatus according to claim 6, wherein the display means comprises an imaging member for imaging the projected picture image.

8. The automatic photograph seal vending apparatus according to claim 7, wherein an image taking point of the photographing means is arranged in an imaging range of the imaging member.

9. The automatic photograph seal vending apparatus according to claim 6, 7, or 8, further comprising a display picture image selection means for selectively displaying a predetermined number of photographed picture images in large size on the large-sized display means when a plurality of photographed picture images are obtained.

10. An automatic photograph seal vending apparatus comprising:
    a photographing process means for creating a photographed picture image or images, wherein an illumination means illuminates one or more subjects in a photographing space and a photographing means takes a photograph,
    an editing process means for creating an edited picture image or images, wherein an editing means edits a picture image or images as an object of editing,
    an output means for outputting a predetermined picture image or images,
    a large-sized display means capable of displaying the one or more subjects substantially in life size for displaying a predetermined picture image or images in the photographing process and/or the editing process; and
    a seal paper unit, the seal paper unit including seal paper, on which a picture image or images are printed, and an identifier permitting identification of genuineness of the seal paper; and an identification means for identifying the identifier to permit printing of the predetermined picture image or images.

11. An automatic photograph seal vending method comprising:
    creating a photographic picture image or images, wherein one or more subjects is illuminated in a photographing space and photographed;
    optionally editing the photographic picture image or images,
    displaying a live view of the one or more subjects such that the whole of the one or more subjects appears substantially in life size or a portion of the one or more subjects appears larger than life size for a period immediately prior to photographing and/or displaying a predetermined picture image or images such that the whole of the one or more subjects appears substantially in life size or a portion of the one or more subjects appears larger than life size during the editing process; and
    outputting a predetermined picture image or images, which originated as said photographic picture image or images.

12. The automatic photograph seal vending method according to claim 11, wherein displaying the predetermined picture image or images includes projecting the picture image or images.

13. The automatic photograph seal vending method according to claim 12, wherein the one or more subjects is photographed from an image taking point; and wherein displaying the one or more subjects substantially in life size for a period immediately prior to photographing includes displaying the one or more subjects such that the display can be viewed simultaneously with the image taking point.

14. The automatic photograph seal vending method according to claim 11, further comprising selecting a predetermined number of photographed picture images and displaying the predetermined number of photographed picture images substantially in life size when a plurality of photographed picture images are obtained.

15. An automatic photograph seal vending method comprising:
    creating a photographic picture image or images, wherein one or more subjects is illuminated in a photographing space and photographed;
    optionally editing the photographic picture image or images,
    displaying the one or more subjects substantially in life size for a period immediately prior to photographing and/or displaying a predetermined picture image or images substantially in life size for the editing process;
    outputting a predetermined picture image or images, which originated as said photographic picture image or images; and
    printing a predetermined picture image or images on seal paper, wherein the seal paper is identified for genuineness.

16. An automatic photograph seal vending method comprising:
    providing a photographing space, the photographing space being at least partially enclosed;
    illuminating at least one user within the photographing space;
    photographing the at least one user within the photographing space to obtain at least one picture image of the at least one user;
    outputting at least one predetermined picture image of the at least one user; and
    displaying the at least one picture image of the at least one user for viewing by the at least one user prior to the act of outputting, the act of displaying comprising using a projector to project the at least one picture image onto a surface, the projector projecting the at least one picture image from a same side of the surface on which the at least one user is located, and comprising one of displaying a picture image of the whole subject substantially in life size and displaying a picture image of a portion of the subject larger than life size.

17. The method of claim 16, wherein the act of photographing comprises obtaining moving picture images of the at least one user.

18. The method of claim 16, further comprising enabling editing of the at least one picture image, and wherein the act of displaying comprises displaying the at least one picture image substantially in life size while the at least one picture image is being edited.

19. The method of claim 16, wherein the act of outputting comprises at least one of printing and sending electronic information over a computer network.

20. An automatic photograph seal vending method comprising:
   providing a photographing space, the photographing space being at least partially enclosed;
   illuminating at least one user within the photographing space;
   photographing the at least one user within the photographing space to obtain at least one picture image of the at least one user;
   outputting at least one predetermined picture image of the at least one user, the act of outputting comprising printing at least one predetermined picture image on seal paper, wherein the seal paper is identified for genuineness; and
   displaying the at least one picture image of the at least one user substantially in life size for viewing by the at least one user prior to the act of outputting.

21. An automatic photograph seal vending apparatus comprising:
   a photographing space, the photographing space being at least partially enclosed;
   at least one light for illuminating at least one user in the photographing space;
   at least one camera for taking images of the at least one user within the photographing space;
   a large-sized display surface for displaying images obtained from the at least one camera of the whole of the at least one user substantially in life size, the large-sized display surface having a front side that is oriented to be viewed by the user and a rear side opposite the front side;
   a projector for projecting images of the at least one user onto the large-sized display surface, the projector being located such that an image is projected onto the front side; and
   an output device for outputting at least one predetermined image of the at least one user.

22. The apparatus of claim 21, wherein the camera is capable of taking moving images.

23. The apparatus of claim 21, further comprising a control unit for enabling editing of the images.

24. The apparatus of claim 21, wherein the output device is at least one of a printer or a computer for sending electronic information over a computer network.

25. An automatic photograph seal vending apparatus comprising:
   a photographing space, the photographing space being at least partially enclosed;
   at least one light for illuminating at least one user in the photographing space;
   at least one camera for taking images of the at least one user within the photographing space;
   a large-sized display surface for displaying images obtained from the at least one camera of the at least one user substantially in life size;
   a printer for outputting at least one predetermined image of the at least one user;
   a seal paper unit, the seal paper unit comprising seal paper, on which the at least one predetermined image printed, and an identification tag for identifying the genuineness of the seal paper; and
   an identification tag reader for identifying the identification tag to permit printing of the at least one predetermined image.

* * * * *